(12) United States Patent
Visco et al.

(10) Patent No.: US 8,828,575 B2
(45) Date of Patent: *Sep. 9, 2014

(54) AQUEOUS ELECTROLYTE LITHIUM SULFUR BATTERIES

(71) Applicants: Steven J. Visco, Berkeley, CA (US); Yevgeniy S. Nimon, Danville, CA (US); Bruce D. Katz, Moraga, CA (US); Lutgard C. De Jonghe, Lafayette, CA (US); Nikolay Goncharenko, Walnut Creek, CA (US); Valentina Loginova, Walnut Creek, CA (US)

(72) Inventors: Steven J. Visco, Berkeley, CA (US); Yevgeniy S. Nimon, Danville, CA (US); Bruce D. Katz, Moraga, CA (US); Lutgard C. De Jonghe, Lafayette, CA (US); Nikolay Goncharenko, Walnut Creek, CA (US); Valentina Loginova, Walnut Creek, CA (US)

(73) Assignee: PolyPlus Batter Company, Berkeley, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 13/676,487

(22) Filed: Nov. 14, 2012

(65) Prior Publication Data

US 2013/0141050 A1    Jun. 6, 2013

Related U.S. Application Data

(63) Continuation-in-part of application No. 13/475,324, (Continued)

(51) Int. Cl.
*H01M 4/58* (2010.01)
*H01M 8/18* (2006.01)
(Continued)

(52) U.S. Cl.
CPC ............ *H01M 8/188* (2013.01); *H01M 4/5815* (2013.01); *H01M 8/20* (2013.01); *H01M 2/40* (2013.01); *H01M 4/382* (2013.01); *H01M 10/052* (2013.01); *H01M 4/1397* (2013.01); *Y02E 60/12* (2013.01); *H01M 4/40* (2013.01); *Y02T 10/7011* (2013.01); *H01M 4/136* (2013.01); *H01M 10/36* (2013.01); *H01M 4/38* (2013.01)

USPC ........................................................ 429/105

(58) Field of Classification Search
CPC ... H01M 4/136; H01M 4/1397; H01M 8/188; H01M 8/20
USPC ........................................................ 429/105
See application file for complete search history.

(56) References Cited

U.S. PATENT DOCUMENTS 3,528,856 A    9/1970  Ovshinsky
3,607,417 A    9/1971  McRae et al.
(Continued)

FOREIGN PATENT DOCUMENTS

EP       0111213    11/1983
EP       0111214    11/1983
(Continued)

OTHER PUBLICATIONS

WO patent application No. PCT/US2012/065251, International Search Report and Written Opinion mailed Mar. 28, 2013.
(Continued)

*Primary Examiner* — Ula C Ruddock
*Assistant Examiner* — Scott J Chmielecki
(74) *Attorney, Agent, or Firm* — Weaver Austin Villeneuve & Sampson LLP

(57) ABSTRACT

Provided are lithium sulfur battery cells that use water as an electrolyte solvent. In various embodiments the water solvent enhances one or more of the following cell attributes: energy density, power density and cycle life. Significant cost reduction can also be realized by using an aqueous electrolyte in combination with a sulfur cathode. For instance, in applications where cost per Watt-Hour (Wh) is paramount, such as grid storage and traction applications, the use of an aqueous electrolyte in combination with inexpensive sulfur as the cathode active material can be a key enabler for the utility and automotive industries, providing a cost effective and compact solution for load leveling, electric vehicles and renewable energy storage.

20 Claims, 17 Drawing Sheets

Related U.S. Application Data filed on May 18, 2012, which is a continuation-in-part of application No. 13/440,847, filed on Apr. 5, 2012.

(60) Provisional application No. 61/585,589, filed on Jan. 11, 2012, provisional application No. 61/560,134, filed on Nov. 15, 2011, provisional application No. 61/623,031, filed on Apr. 11, 2012.

(51) Int. Cl.
| | | |
|---|---|---|
| *H01M 8/20* | (2006.01) | |
| *H01M 4/38* | (2006.01) | |
| *H01M 4/1397* | (2010.01) | |
| *H01M 4/136* | (2010.01) | |
| *H01M 10/36* | (2010.01) | |
| *H01M 2/40* | (2006.01) | |
| *H01M 10/052* | (2010.01) | |
| *H01M 4/40* | (2006.01) | |

(56) References Cited

U.S. PATENT DOCUMENTS

| | | |
|---|---|---|
| 3,615,835 A | 10/1971 | Ovshinsky |
| 3,625,769 A | 12/1971 | Lyall |
| 3,703,415 A | 11/1972 | Mitoff et al. |
| 3,912,536 A | 10/1975 | Galli et al. |
| 3,976,509 A | 8/1976 | Tsai et al. |
| 4,007,057 A | 2/1977 | Littauer et al. |
| 4,091,182 A | 5/1978 | Farrington et al. |
| 4,162,202 A | 7/1979 | Dey |
| 4,163,084 A | 7/1979 | Tsai et al. |
| 4,210,707 A | 7/1980 | Farrington |
| 4,402,995 A | 9/1983 | Fleischer |
| 4,405,416 A | 9/1983 | Raistrick et al. |
| 4,414,293 A | 11/1983 | Joy et al. |
| 4,504,561 A | 3/1985 | Winsel |
| 4,828,942 A | 5/1989 | Licht |
| 4,833,048 A | 5/1989 | De Jonghe et al. |
| 4,916,036 A | 4/1990 | Cheiky |
| 4,917,974 A | 4/1990 | Visco et al. |
| 4,981,672 A | 1/1991 | De Neufville et al. |
| 4,985,317 A | 1/1991 | Adachi et al. |
| 5,035,963 A | 7/1991 | Plichta |
| 5,100,523 A | 3/1992 | Helms et al. |
| 5,108,856 A | 4/1992 | Shuster |
| 5,162,175 A | 11/1992 | De Jonghe et al. |
| 5,166,011 A | 11/1992 | Rao et al. |
| 5,198,081 A | 3/1993 | Kanoh et al. |
| 5,213,908 A | 5/1993 | Hagedorn |
| 5,314,765 A | 5/1994 | Bates |
| 5,336,384 A | 8/1994 | Tsou et al. |
| 5,338,625 A | 8/1994 | Bates et al. |
| 5,342,710 A | 8/1994 | Koksbang |
| 5,387,479 A | 2/1995 | Koksbang |
| 5,409,786 A | 4/1995 | Bailey |
| 5,413,881 A * | 5/1995 | Licht et al. .................... 429/105 |
| 5,427,873 A | 6/1995 | Shuster |
| 5,455,126 A | 10/1995 | Bates et al. |
| 5,506,068 A | 4/1996 | Dan et al. |
| 5,510,209 A | 4/1996 | Abraham et al. |
| 5,512,147 A | 4/1996 | Bates et al. |
| 5,516,598 A | 5/1996 | Chu et al. |
| 5,523,179 A | 6/1996 | Chu |
| 5,525,442 A | 6/1996 | Shuster |
| 5,532,077 A | 7/1996 | Chu |
| 5,567,210 A | 10/1996 | Bates et al. |
| 5,569,520 A | 10/1996 | Bates |
| 5,571,600 A | 11/1996 | Licht |
| 5,582,623 A | 12/1996 | Chu |
| 5,597,660 A | 1/1997 | Bates et al. |
| 5,612,152 A | 3/1997 | Bates |
| 5,648,183 A | 7/1997 | Licht et al. |
| 5,648,187 A | 7/1997 | Skotheim |
| 5,652,068 A | 7/1997 | Shuster et al. |
| 5,665,481 A | 9/1997 | Shuster et al. |
| 5,686,201 A | 11/1997 | Chu |
| 5,696,201 A | 12/1997 | Cavalloni et al. |
| 5,702,995 A | 12/1997 | Fu |
| 5,789,108 A | 8/1998 | Chu |
| 5,814,420 A | 9/1998 | Chu |
| 5,882,812 A | 3/1999 | De Johnge et al. |
| 5,961,672 A | 10/1999 | Skotheim et al. |
| 5,962,171 A | 10/1999 | Boguslavsky et al. |
| 6,017,651 A | 1/2000 | Chu et al. |
| 6,025,094 A | 2/2000 | Visco et al. |
| 6,025,095 A | 2/2000 | Kawamura |
| 6,030,720 A | 2/2000 | Chu et al. |
| 6,030,909 A | 2/2000 | Fu |
| 6,066,417 A | 5/2000 | Cho et al. |
| 6,068,950 A | 5/2000 | Gan et al. |
| 6,096,447 A | 8/2000 | Gan et al. |
| 6,110,236 A | 8/2000 | Chu et al. |
| 6,146,787 A | 11/2000 | Harrup et al. |
| 6,165,644 A | 12/2000 | Chu et al. |
| 6,183,901 B1 | 2/2001 | Ying et al. |
| 6,198,701 B1 | 3/2001 | De Jonghe et al. |
| 6,200,701 B1 | 3/2001 | Gan et al. |
| 6,200,704 B1 | 3/2001 | De Jonghe et al. |
| 6,203,942 B1 | 3/2001 | Gan et al. |
| 6,203,947 B1 | 3/2001 | Peled et al. |
| 6,207,324 B1 | 3/2001 | Licht |
| 6,210,832 B1 | 4/2001 | Chu et al. |
| 6,214,061 B1 | 4/2001 | Visco et al. |
| 6,225,002 B1 | 5/2001 | Chu et al. |
| 6,228,527 B1 | 5/2001 | Medeiros et al. |
| 6,248,481 B1 | 6/2001 | De Johnge et al. |
| 6,274,269 B1 | 8/2001 | Gan et al. |
| 6,280,598 B1 | 8/2001 | Barton et al. |
| 6,296,958 B1 | 10/2001 | Pinto et al. |
| 6,315,881 B1 | 11/2001 | Fu |
| 6,344,293 B1 | 2/2002 | Geronov |
| 6,358,643 B1 | 3/2002 | Katz et al. |
| 6,358,651 B1 | 3/2002 | Chen et al. |
| 6,376,123 B1 | 4/2002 | Chu |
| 6,391,492 B1 | 5/2002 | Kawakami et al. |
| 6,402,795 B1 | 6/2002 | Chu et al. |
| 6,413,284 B1 | 7/2002 | Chu et al. |
| 6,413,285 B1 | 7/2002 | De Jonghe et al. |
| 6,432,584 B1 | 8/2002 | Visco et al. |
| 6,475,677 B1 | 11/2002 | Inda et al. |
| 6,485,622 B1 | 11/2002 | Fu |
| 6,489,055 B1 | 12/2002 | Ichihashi et al. |
| 6,495,285 B2 | 12/2002 | Gan et al. |
| 6,511,772 B2 | 1/2003 | Gan et al. |
| 6,537,698 B2 | 3/2003 | Gan et al. |
| 6,537,701 B1 | 3/2003 | Chu et al. |
| 6,632,573 B1 | 10/2003 | Nimon et al. |
| 6,723,140 B2 | 4/2004 | Chu et al. |
| 6,733,924 B1 | 5/2004 | Skotheim et al. |
| 6,737,197 B2 | 5/2004 | Chu et al. |
| 6,766,817 B2 | 7/2004 | Da Silva |
| 6,770,187 B1 | 8/2004 | Putter et al. |
| 6,797,428 B1 | 9/2004 | Skotheim et al. |
| 6,835,492 B2 | 12/2004 | Cho et al. |
| 6,911,280 B1 | 6/2005 | De Jonghe et al. |
| 6,955,866 B2 | 10/2005 | Nimon et al. |
| 6,991,662 B2 | 1/2006 | Visco et al. |
| 7,070,632 B1 | 7/2006 | Visco et al. |
| 7,211,351 B2 | 5/2007 | Klaassen |
| 7,211,532 B2 | 5/2007 | Fu |
| 7,247,408 B2 | 7/2007 | Skotheim |
| 7,282,295 B2 | 10/2007 | Visco et al. |
| 7,282,296 B2 | 10/2007 | Visco et al. |
| 7,282,302 B2 | 10/2007 | Visco et al. |
| 7,344,804 B2 | 3/2008 | Klaassen |
| 7,390,591 B2 | 6/2008 | Visco et al. |
| 7,432,017 B2 | 10/2008 | Visco et al. |
| 7,491,458 B2 | 2/2009 | Visco et al. |
| 7,608,178 B2 | 10/2009 | De Jonghe et al. |
| 7,645,543 B2 | 1/2010 | Visco et al. |
| 7,666,233 B2 | 2/2010 | Visco et al. |
| 7,771,870 B2 | 8/2010 | Affinito et al. |
| 7,781,108 B2 | 8/2010 | Visco et al. |

(56) References Cited

U.S. PATENT DOCUMENTS

| | | | |
|---|---|---|---|
| 7,829,212 | B2 | 11/2010 | Visco et al. |
| 7,838,144 | B2 | 11/2010 | Visco et al. |
| 7,858,223 | B2 | 12/2010 | Visco et al. |
| 7,998,626 | B2 | 8/2011 | Visco et al. |
| 8,048,571 | B2 | 11/2011 | Visco et al. |
| 8,114,171 | B2 | 2/2012 | Visco et al. |
| 8,182,943 | B2 | 5/2012 | Visco et al. |
| 8,202,649 | B2 | 6/2012 | Visco et al. |
| 8,334,075 | B2 | 12/2012 | Visco et al. |
| 2001/0014420 | A1 | 8/2001 | Takeuchi et al. |
| 2001/0028977 | A1 | 10/2001 | Kazacos et al. |
| 2001/0041294 | A1 | 11/2001 | Chu et al. |
| 2002/0012845 | A1 | 1/2002 | Choi et al. |
| 2002/0012846 | A1 | 1/2002 | Skotheim et al. |
| 2002/0034688 | A1 | 3/2002 | Chu et al. |
| 2002/0068220 | A1 | 6/2002 | Wyler |
| 2002/0102465 | A1 | 8/2002 | Chen et al. |
| 2002/0106563 | A1 | 8/2002 | Okawa |
| 2003/0124433 | A1 | 7/2003 | Kim |
| 2003/0190501 | A1 | 10/2003 | Rendina |
| 2003/0224234 | A1 | 12/2003 | Steele et al. |
| 2004/0081894 | A1 | 4/2004 | Nimon |
| 2004/0126653 | A1 | 7/2004 | Visco et al. |
| 2004/0142244 | A1 | 7/2004 | Visco et al. |
| 2004/0185334 | A1 | 9/2004 | Iwamoto |
| 2004/0191617 | A1 | 9/2004 | Visco et al. |
| 2004/0197641 | A1 | 10/2004 | Visco et al. |
| 2005/0095506 | A1 | 5/2005 | Klaassen |
| 2005/0100792 | A1 | 5/2005 | Visco et al. |
| 2005/0100793 | A1 | 5/2005 | Jonghe et al. |
| 2005/0158614 | A1 | 7/2005 | Hennessy |
| 2005/0158615 | A1 | 7/2005 | Samuel et al. |
| 2005/0175894 | A1 | 8/2005 | Visco et al. |
| 2005/0186469 | A1 | 8/2005 | De Jonghe et al. |
| 2005/0208353 | A1 | 9/2005 | Johnson |
| 2006/0046149 | A1 | 3/2006 | Yong et al. |
| 2006/0063051 | A1 | 3/2006 | Jang |
| 2006/0078790 | A1 | 4/2006 | Nimon et al. |
| 2006/0183011 | A1 | 8/2006 | Mittelsteadt et al. |
| 2006/0208701 | A1 | 9/2006 | Mikhaylic |
| 2007/0087269 | A1 | 4/2007 | Inda |
| 2007/0117007 | A1 | 5/2007 | Visco et al. |
| 2007/0117026 | A1 | 5/2007 | Kumar et al. |
| 2007/0172739 | A1* | 7/2007 | Visco et al. ............ 429/322 |
| 2007/0231704 | A1 | 10/2007 | Inda |
| 2008/0038641 | A1 | 2/2008 | Visco et al. |
| 2008/0052898 | A1 | 3/2008 | Visco et al. |
| 2008/0057386 | A1 | 3/2008 | Visco et al. |
| 2008/0057387 | A1 | 3/2008 | Visco et al. |
| 2008/0057399 | A1 | 3/2008 | Visco et al. |
| 2009/0286114 | A1 | 11/2009 | Visco et al. |
| 2009/0297935 | A1 | 12/2009 | Visco et al. |
| 2010/0104934 | A1 | 4/2010 | Visco et al. |
| 2011/0014522 | A1 | 1/2011 | Visco et al. |
| 2011/0039144 | A1 | 2/2011 | Visco et al. |
| 2011/0269031 | A1 | 11/2011 | Visco et al. |
| 2012/0009469 | A1 | 1/2012 | Visco et al. |
| 2012/0094188 | A1 | 4/2012 | Visco et al. |

FOREIGN PATENT DOCUMENTS

| | | |
|---|---|---|
| EP | 0694501 | 1/1996 |
| EP | 0838441 | 4/1998 |
| EP | 0875951 | 11/1998 |
| EP | 0689260 | 4/1999 |
| EP | 1162675 | 12/2001 |
| EP | 1892780 | 2/2008 |
| JP | 55-081471 | 6/1980 |
| JP | 57-003371 | 1/1982 |
| JP | 57-017568 | 1/1982 |
| JP | 62-243247 | 10/1987 |
| JP | 63-198261 | 8/1988 |
| JP | 09-320645 | 12/1997 |
| JP | 2001-351615 | 12/2001 |
| JP | 2002-513991 | 5/2002 |
| JP | 2002-518796 | 6/2002 |
| WO | 98/28811 | 7/1998 |
| WO | 99/57770 | 11/1999 |
| WO | 00/51198 | 8/2000 |
| WO | 01/39302 | 5/2001 |
| WO | 01/33651 | 10/2001 |
| WO | 02/50933 | 6/2002 |
| WO | 02/095849 | 11/2002 |
| WO | 2004/036669 | 4/2004 |
| WO | 2005/038953 | 4/2005 |
| WO | 2005/038962 | 4/2005 |

OTHER PUBLICATIONS

U.S. Appl. No. 13/161,351, Office Action mailed Jul. 12, 2013.
U.S. Appl. No. 13/161,351, Notice of Allowance mailed Apr. 17, 2014.
International Search Report and Written Opinion dated Oct. 18, 2005 from International Application No. PCT/US2004/033372.
U.S. Appl. No. 11/092,781, Office Action mailed Jun. 16, 2006.
U.S. Appl. No. 11/092,781, Office Action mailed Feb. 1, 2007.
U.S. Appl. No. 11/092,781, Office Action mailed Jun. 25, 2007.
U.S. Appl. No. 11/092,781, Office Action mailed Feb. 22, 2008.
U.S. Appl. No. 10/686,189, Office Action mailed Oct. 12, 2006.
U.S. Appl. No. 10/686,189, Office Action mailed Apr. 11, 2007.
U.S. Appl. No. 10/731,771, Office Action mailed Sep. 28, 2006.
U.S. Appl. No. 10/731,771, Office Action mailed Mar. 16, 2007.
U.S. Appl. No. 10/772,157, Office Action mailed Nov. 1, 2007.
U.S. Appl. No. 10/772,157, Office Action mailed Feb. 6, 2008.
U.S. Appl. No. 10/772,157, Office Action mailed Jul. 11, 2008.
U.S. Appl. No. 10/772,157, Office Action mailed Dec. 30, 2008.
U.S. Appl. No. 11/824,548, Office Action mailed Mar. 20, 2008.
U.S. Appl. No. 11/824,548, Office Action mailed Jan. 26, 2009.
U.S. Appl. No. 10/825,587, Office Action mailed Jun. 25, 2007.
U.S. Appl. No. 10/825,587, Office Action mailed Apr. 1, 2008.
U.S. Appl. No. 10/825,587, Office Action mailed Jun. 5, 2008.
U.S. Appl. No. 10/825,587, Office Action mailed Oct. 16, 2008.
U.S. Appl. No. 10/772,228, Office Action mailed Sep. 21, 2007.
U.S. Appl. No. 10/772,228, Office Action mailed Nov. 28, 2006.
U.S. Appl. No. 10/824,944, Office Action mailed Mar. 12, 2007.
U.S. Appl. No. 10/824,944, Office Action mailed Sep. 7, 2006.
U.S. Appl. No. 11/245,472, Office Action mailed Aug. 23, 2007.
U.S. Appl. No. 11/245,472, Office Action mailed Apr. 16, 2008.
U.S. Appl. No. 10/986,441, Office Action mailed Oct. 20, 2008.
U.S. Appl. No. 11/823,847, Office Action mailed Sep. 16, 2008.
U.S. Appl. No. 12/649,245, Office Action mailed Mar. 31, 2010.
U.S. Appl. No. 10/825,587, Notice of Allowance mailed Nov. 24, 2008.
U.S. Appl. No. 10/772,228, Notice of Allowance mailed Jan. 22, 2008.
U.S. Appl. No. 11/824,574, Office Action mailed Dec. 31, 2008.
China patent application No. 2003801061464, First Office Action mailed Oct. 27, 2006.
Nippon Telegr & Teleph Corp., "Patent Abstracts of Japan," vol. 008, No. 119 (E-248), Jun. 5, 1984 & JP 59 031573 A, Feb. 20, 1984.
Anders et al., "Plasma is Produced Simply", R&D Research & Development, R&D Magazine, vol. 39, No. 10, Sep. 1997, www.rdmag.com, p. 65.
Steven D. Jones, et al., "Thin film rechargeable Li batteries", 1994, *Solid State Ionics*.
J.B. Bates, et al., "Thin-film rechargeable lithium batteries," 1995, *Journal of Power Sources*.
N. J. Dudney, et al., "Sputtering of lithium compounds for preparation of electrolyte thin films," 1992, *Solid State Ionics*.
J. B. Bates, et al., "Electrical properties of amorphous lithium electrolye thin films," 1992, *Solid State Ionics*.
Xiaohua Yu, et al, "A Stable Thin-Film Lithium Electrolyte: Lithium Phosphorus Oxynitride," Feb. 1997, *J. Electrochem. Soc.*, vol. 144, No. 2.
Fu, Jie, "Fast Li+ Ion Conduction in $Li_2O$—$Al_2O_3$—$TiO_2$—$SiO_2$—$P_2O_5$ Glass-Ceramics", Journal of the American Ceramics Society, vol. 80, No. 7, Jul. 1997, pp. 1-5.

(56) References Cited

OTHER PUBLICATIONS

Aono et al., "Ionic Conductivity of the Lithium Titanium Phosphate $(Li_{1+x}M_xTi_{2-x}(PO_4)_3$, M = Ai, Sc, Y, and La) Systems", Dept. of Industrial Chemistry, pp. 590-591, Aug. 19, 1988.
Aono, Hiromichi, "High Li+ Conducting Ceramics", Acc. Chem. Res. vol. 27, No. 9, 1994, pp. 265-270.
Aono, et al., "Ionic Conductivity and Sinterability of Lithium Titanium Phosphate System", Solid State Ionics, 40/41 (1990), pp. 38-42.
Aono, et al., "Electrical properties and crystal structure of solid electrolyte based on lithium hafnium phosphate $LiHf_2(PO_4)_3$", Solid State Ionics 62 (1993), pp. 309-316.
Aono, et al., "Electrical property and sinterability of $LiTi_2(PO_4)_3$ mixed with lithium salt ($Li_3PO_4$ or $Li_3BO_3$)", Solid State Ionics 47 (1991) pp. 257-264.
Aono, et al., "Ionic Conductivity of $\beta$=$Fe_2(SO_4)_3$ Type $Li_3Cr_2(PO_4)_3$ Based Electrolyte", Chemistry Letters, 1993, pp. 2033-2036.
Aono, et al., "Ionic Conductivity of $LiTi_2(PO_4)_3$ Mixed with Lithium Salts", Chemistry Letters, 1990, pp. 331-334.
Fu, Jie, "Superionic conductivity of glass-ceramics in the system $Li_2O$—$Al_2O_3$—$TiO_3$—$P_2O_5$", Solid State Ionics, 96 (1997), pp. 195-200.
Fu, Jie, "Fast Li+ ion conducting glass-ceramics in the system $Li_2O$—$Al_{23}$—$GeO_2$—$P_2O_5$" Solid State Ionics 104 (1997), pp. 191-194.
Aono, et al., "DC Conductivity of $Li_{1.3}Al_{0.3}Ti_{1.7}(PO_4)_3$" Ceramic with Li Electrodes, Chemistry Letters, 1991, pp. 1567-1570.
Aono, et al., "Electrical Properties of Sintered Lithium Titanium Phosphate Ceramics ($Li_{1+x}M_xTi_{2-x}PO_4)_3$,$M^{3+}$ = $Al^{3+}$,$Sc^{3+}$, or $Y^{3+}$)", Chemistry Letters, 1990, pp. 1825-1828.
Button, et al., "Structural disorder and enhanced ion transport in amorphous conductors", Solid State Ionics, vols. 9-10, Part 1, Dec. 1983, pp. 585-592 (abstract).
Shuster, Nicholas, "LithiumWater Power Source for Low Power—Long Duration Undersea Applications", Westinghouse Electric Corporation, 1990 IEEE, pp. 118-123.
VanVoorhis, et al., "Evaluation of Air Cathodes for Lithium/Air Batteries", Electrochemical Society Proceedings vol. 98-16, 1999, pp. 383-390.
Blurton et al., "Metal/Air Batteries: Their Status and Potential—A Review", Journal of Power Sources, 4, (1979), pp. 263-279.
J. Read, "Characterization of the Lithium/Oxygen Organic Electrolyte Battery", Journal of the Electrochemical Society, 149 (9) (2002), pp. A1190-A1195.
Abraham et al., "A Polymer Electrolyte-Based Rechargeable Lithium/Oxygen Battery", Technical Papers, Electrochemical Science and Technology, J. Electrochem. Soc., vol. 143, No. 1, Jan. 1996, pp. 1-5.
Kessler, et al., "Large Microsheet Glass for 40-in. Class PALC Displays", 1997, FMC2-3, pp. 61-63.
Feng et al., "Electrochemical behavior of intermetallic-based metal hydrides used in Ni/metal hydride (MH) batteries: a review", International Journal of Hydrogen Energy, 26 (2001), pp. 725-734.
Iwakura et al., "All solid-state nickel/metal hydride battery with a proton-conductive phosphoric acid-doped silica gel electrolyte", Electrochimica Acta 48 (2003), pp. 1499-1503.
Li et al., "Lithium-Ion Cells with Aqueous Electrolytes", J. Electrochem. Soc., vol. 142, No. 6, Jun. 1995, pp. 1742-1746.
Zhang et al., "Electrochemical Lithium Intercalation in $VO_2$(B) in Aqueous Electrolytes", J. Electrochem. Soc., vol. 143, No. 9, Sep. 1996, pp. 2730-2735.
Urquidi-Mcdonald, Mirna, "Hydrogen storage and semi-fuel cells", http://engr.psu.edu/h2e/Pub/Macdonald1.htm, (downloaded Jan. 27, 2004, 3 pages).
Urquidi-Mcdonald, et al., "Lithium/poly(organophosphazene) membrane anodes in KOH and seawater", Electrochimica Acta 47, (2002), pp. 2495-2503.
Nimon et al., "Stability of Lithium Electrode in Contact with Glass Electrolytes", SSI-14, Jun. 22-27, 2003, Monterey, CA. (conference poster).
Nimon et al., "Stability of Lithium Electrode in Contact with Glass Electrolytes", SSI-14 Conference, Monterey, CA, Jun. 22, 2003, Abstract of Poster.
Inaguma et al., "High Ionic Conductivity in Lithium Lanthanum Titanate", Solid State Communications, vol. 86, No. 10, pp. 689-693, 1993.
AU patent application No. 2003301383, Examination Report mailed Sep. 29, 2008.
CN patent application No. 200480042697.3, Office Action mailed Feb. 15, 2008.
U.S. Appl. No. 11/245,472, Office Action mailed Jul. 24, 2008.
CN patent application No. 200480042697.3, Office Action mailed Dec. 19, 2008.
Thokchom, Joykumar S., et al., Water Durable Lithium Ion Conducting Composite Membranes from the $Li_2O$—$Al_2O_3$—$TiO_2$—$P_2O_5$ Glass Ceramic *Journal of The Electrochemical Society*, 154 (4), 2007, pp. A331-A336.
U.S. Appl. No. 11/245,472, Office Action mailed Jan. 8, 2009.
U.S. Appl. No. 11/824,579, Office Action mailed Jan. 29, 2009.
U.S. Appl. No. 11/823,847, Office Action mailed Apr. 28, 2009.
CN patent application No. 200480042697.3, Office Action mailed Jun. 5, 2009.
U.S. Appl. No. 11/245,472, Office Action mailed Jul. 8, 2009.
AU patent application No. 2004306866, Exam Report mailed Apr. 9, 2009.
AU patent application No. 2004316638, Office Action mailed Aug. 3, 2009.
U.S. Appl. No. 10/986,441, Notice of Allowance mailed Jun. 19, 2009.
U.S. Appl. No. 10/772,157, Notice of Allowance mailed Sep. 17, 2009.
International patent application No. PCT/US06/48755, International Search Reportmailed Apr. 7, 2008.
International patent application No. PCT/US06/48755, Written Opinion mailed Apr. 7, 2008.
Ogasawara T. et al., "Rechargeable $Li_2O_2$ Electrode for Lithium Batteries", J. Am. Chem. Soc. 128(4), 2006, pp. 1390-1393.
Foster D.L. et al., "Ceramic Membranes for Lithium Batteries", Proceeding of the 42nd Power Sources Conference, Jun. 2006, p. 2.14.
Read J., "Electrolyte Formulation and Temperature Performance of the $Li/O_2$ Battery", Proceeding of the 9th Electrochemical Power Sources R&D Symposium, Jun. 2005, 15 pages.
EP patent application No. 04794699.1, Notice of Allowance mailed Jun. 10, 2009.
U.S. Appl. No. 12/334,116, Office Action mailed Oct. 27, 2009.
EP patent application No. 03809186.4, Examination Report mailed Nov. 24, 2009.
U.S. Appl. No. 11/824,548, Notice of Allowance mailed Dec. 17, 2009.
U.S. Appl. No. 11/245,472, Office Action mailed Feb. 4, 2010.
U.S. Appl. No. 12/475,403, Office Action mailed Feb. 8, 2010.
AU patent application No. 2003301383, Notice of Acceptance mailed Nov. 26, 2009.
CN patent application No. 200480037293.5, Office Action mailed Jan. 29, 2010.
EP patent application No. 04794655.3, Examination Report mailed Apr. 22, 2010.
CA patent application No. 2,502,438, Examination Report mailed May 12, 2010.
U.S. Appl. No. 11/562,883, Office Action mailed Jun. 7, 2010.
AU patent application No. 2006280097, Examination Report mailed Jun. 9, 2010.
JP patent application No. 2004-545584, Notification of reason for rejection mailed Jun. 8, 2010.
U.S. Appl. No. 12/475,403, Office Action mailed Jun. 22, 2010.
U.S. Appl. No. 11/824,579, Office Action mailed Jun. 25, 2010.
CN patent application No. 200480037293.5, Office Action mailed Jun. 24, 2010.
AU patent application No. 2004306866, Notice of Acceptance mailed Jun. 17, 2010.
U.S. Appl. No. 12/831,066, "Active Metal Fuel Cells", Visco et al., filed Jul. 6, 2010.
U.S. Appl. No. 12/649,245, Office Action mailed Jul. 19, 2010.

(56) References Cited

OTHER PUBLICATIONS

U.S. Appl. No. 12/831,066, Office Action mailed Aug. 18, 2010.
U.S. Appl. No. 11/824,597, Notice of Allowance mailed Sep. 9, 2010.
KR patent application No. 10-2005-7006382, Office Action mailed Aug. 31, 2010.
U.S. Appl. No. 12/475,403, Notice of Allowance mailed Oct. 7, 2010.
U.S. Appl. No. 12/907,819, "In situ formed ionically conductive membranes for protection of active metal anodes and battery cells", Visco et al., filed Oct. 19, 2010.
Thangadurai, Venkataraman et al., "Novel fast lithium ion conduction in garnet-type $Li_5La_3M_2O_{12}$ (M = Nb, Ta)", J. Am. Chem. Soc. 86 (3) 437-40 (2003), Oct. 21, 2002.
U.S. Appl. No. 12/649,245, Office Action mailed Nov. 30, 2010.
U.S. Appl. No. 11/612,741, Office Action mailed Nov. 29, 2010.
U.S. Appl. No. 11/562,883, Office Action mailed Jan. 19, 2011.
U.S. Appl. No. 12/831,066, Office Action mailed Jan. 19, 2011.
CA patent application No. 2,542,304, Examination Report mailed Apr. 4, 2011.
U.S. Appl. No. 12/831,066, Notice of Allowance mailed Apr. 6, 2011.
U.S. Appl. No. 12/907,819, Office Action mailed May 12, 2011.
Visco, S.J. et al., "Lithium-Air", Encyclopedia of Electrochemical Power Sources, Dyer (editor), Elsevier, 2009, ISBN: 9780444527455, pp. 376-383.
CA patent application No. 2,555,637, Exam Report mailed May 10, 2011.
KR patent application No. 10-2006-7017692, Notice to Submit Response mailed May 13, 2011.
JP patent application No. 2006-535572, Office Action mailed Jun. 21, 2011.
JP patent application No. 2006-552102, Office Action mailed Jul. 5, 2011.
U.S. Appl. No. 11/612,741, Office Action mailed Jul. 22, 2011.
U.S. Appl. No. 12/649,245, Notice of Allowance mailed Sep. 14, 2011.
KR patent application No. 2006-7007309, Office Action mailed Jul. 27, 2011.
KR patent application No. 2005-7006382, Office Action mailed Aug. 10, 2011.
U.S. Appl. No. 12/907,819, Notice of Allowance mailed Nov. 10, 2011.
U.S. Appl. No. 13/236,428, Office Action mailed Nov. 16, 2011.
U.S. Appl. No. 13/336,459, "Solid State Battery", Visco et al., filed Dec. 23, 2011.
CN patent application No. 200910174918.7, Office Action mailed Oct. 19, 2011.
U.S. Appl. No. 11/612,741, Notice of Allowance mailed Feb. 3, 2012.
CA patent application No. 2,542,304, Exam Report mailed Apr. 3, 2012.
KR patent application No. 9-5-2012-016417008, Office Action mailed Mar. 21, 2012.
U.S. Appl. No. 13/236,428, Notice of Allowance mailed Apr. 25, 2012.
U.S. Appl. No. 12/888,154, Office Action mailed May 3, 2012.
KR patent application No. 10-2005-7006382, Office Action mailed Mar. 31, 2012.
U.S. Appl. No. 13/464,835, "Protected lithium electrodes having tape cast ceramic and glass-ceramic membranes," Visco et al., filed May 4, 2012.
U.S. Appl. No. 13/336,459, Office Action mailed Jun. 7, 2012.
U.S. Appl. No. 13/453,964, "Substantially impervious lithium super ion conducting membranes," Visco et al., filed Apr. 23, 2012.
U.S. Appl. No. 13/182,322, Office Action mailed Jul. 5, 2012.
EP patent application No. 03809186.4, Exam Report mailed Jun. 21, 2012.
U.S. Appl. No. 13/453,964, Notice of Allowance mailed Aug. 14, 2012.
U.S. Appl. No. 12/888,154, Notice of Allowance mailed Aug. 20, 2012.
U.S. Appl. No. 13/464,835, Office Action mailed Sep. 25, 2012.
U.S. Appl. No. 13/182,322, Notice of Allowance mailed Sep. 19, 2012.
JP patent application No. 2006-552102, Office Action mailed Sep. 25, 2012.
KR patent application No. 10-2005-7006382, Notice to Submit Response mailed Oct. 30, 2012.
U.S. Appl. No. 13/475,324, "Aqueous electrolyte lithium sulfur batteries," Visco et al., filed May 18, 2012.
U.S. Appl. No. 13/440,847, "Aqueous electrolyte lithium sulfur batteries," Visco et al., filed Apr. 5, 2012.
Licht et al., "A solid sulfur cathode for aqueous batteries," *Science*, vol. 261, No. 5124 (Aug. 20, 1993) 1029-1032.
Licht et al., "Investigation of a novel aqueous aluminum/sulfur battery," *Journal of Power Sources*, 45 (1993) 311-323.
Kobayashi et al., "All-solid-state lithium secondary battery with ceramic-polymer composite electrolyte", Solid State Ionics 152-153 (2002) 137-142.
Will et al., "Primary Sodium Batteries with Beta-Alumina Solid Electrolyte", J. Electrochemical Science and Technology, Apr. 1975, vol. 122, No. 4, pp. 457-461.
EP patent application No. 03809186.4, Examination Report dated Mar. 21, 2006.
International patent application No. PCT/US2004/033371, International Search Report dated Mar. 6, 2006.
International patent application No. PCT/US2004/033424, International Search Report dated Jan. 6, 2006.
Galbraith, A.D., "The lithium-water-air battery for automotive propulsion", XP002355800, retrieved from STN Database accession No. 1979:106901 abstract and Symp. Int. Veh. Electr., Rapp, $4^{th}$ vol. 1, paper 32.4, 23 pp., Publisher: Electr. Veh. Counc., New York, N.Y. Conden: 39UPAD, 1976.
International patent application No. PCT/US2004/033361, International Search Report and Written Opinion dated Jan. 16, 2006.
International patent application No. PCT/US2004/033424, International Search Report and Written Opinion dated Mar. 6, 2006.
West, et al., "Chemical stability enhancement of lithium conducting solid electrolyte plates using sputtered LiPON thin films", Journal of Power Sources, vol. 126, Issues 1-2, pp. 1-272 (Feb. 16, 2004).
International patent application No. PCT/US2004/033424, Invitation to Pay Additional Fees dated Jan. 6, 2006.
EP patent application No. 04794699.1, Examination Report dated May 31, 2007.
WO patent application No. PCT/US06/45407, International Search Report and Written Opinion, mailed Aug. 30, 2007.
CN patent application No. 200480037293.5, Office Action mailed Aug. 22, 2008.
EP patent application No. 04794699.1, Examination Report mailed Aug. 5, 2008.

\* cited by examiner

AQUEOUS ELECTROLYTE LITHIUM SULFUR BATTERIES

CROSS-REFERENCE TO RELATED APPLICATIONS

This application is a continuation-in-part of U.S. patent application Ser. No. 13/475,324, filed May 18, 2012, titled AQUEOUS ELECTROLYTE LITHIUM SULFUR BATTERIES; which is a continuation-in-part of U.S. patent application Ser. No. 13/440,847, filed Apr. 5, 2012, titled AQUEOUS ELECTROLYTE LITHIUM SULFUR BATTERIES; which claims priority to U.S. Provisional Patent Application Nos. 61/585,589, filed Jan. 11, 2012, titled AQUEOUS LITHIUM-SULFUR BATTERY CELL, and 61/560,134, filed Nov. 15, 2011, titled AQUEOUS LITHIUM-SULFUR BATTERY. This application also claims priority from U.S. Provisional Patent Application Nos. 61/623,031, filed Apr. 11, 2012, titled AQUEOUS ELECTROLYTE LITHIUM SULFUR BATTERIES. Each of these applications is incorporated herein by reference in its entirety and for all purposes.

FIELD OF THE INVENTION

The present invention relates generally to the field of electrochemical energy storage and power delivery. In particular, the present invention is directed to aqueous lithium-sulfur battery cells, including flow cells and systems thereof, and methods of making and operating such cells.

BACKGROUND OF THE INVENTION

The lithium sulfur battery has a theoretical capacity of 1675 mAhg$^{-1}$ and approximately 2300 Wh/kg. The low cost and exceptionally high specific capacity of sulfur renders it an especially attractive battery cathode material for large-scale energy storage, including electric vehicle and grid storage applications. Yet after more than twenty years of research and development at various battery companies and scientific institutions worldwide, key technical problems with the sulfur electrode have precluded meaningful commercialization of the Li—S battery.

SUMMARY OF THE INVENTION

In one aspect the invention provides an aqueous lithium sulfur battery cell having an anode structure comprising an electroactive material, a cathode comprising a solid electron transfer medium, an aqueous electrolyte in contact with the electron transfer medium, and active sulfur species in contact with the aqueous electrolyte, and wherein the anode electroactive material is isolated from direct contact with the aqueous electrolyte. Notably, while the anode electroactive material is isolated from touching (i.e., directly contacting) the aqueous electrolyte, it is nonetheless configured in the anode structure to be in lithium ion communication with the aqueous electrolyte. Moreover, because the aqueous electrolyte does not touch the anode electroactive material but does directly contact the cathode the term "aqueous catholyte" (or more simply "catholyte") is used interchangeably with the term "aqueous electrolyte".

In various embodiments the aqueous electrolyte is electroactive in that it contains dissolved active sulfur species that undergo electrochemical redox at the cathode during discharge and charge. Without limitation, the dissolved redox active sulfur species may include sulfide anions ($S^{2-}$), hydrosulfide anions ($HS^-$), and polysulfide anions including $S_x^{2-}$ with x>1 (e.g., $S_2^{2-}$, $S_3^{2-}$, $S_4^{2-}$, $S_5^{2-}$, $S_6^{2-}$) and related radical anions $S_x^-$ thereof and hydropolysulfide anions ($HS_x^-$ with x>1), and combinations thereof.

In accordance with the present invention, the amount of water in the catholyte is significant (i.e., not merely a trace amount). In various embodiments the volume percent of water relative to the total liquid solvent volume in the catholyte is greater than 5%, 10%, 20%, 30%, 40%, 50%, 60%, 70%, 80%, and greater than 90%. In certain embodiments water is the only liquid solvent in the catholyte (i.e., water constitutes 100% of the solvent volume of the catholyte). In various embodiments water is the main liquid solvent in the catholyte. By use of the term main liquid solvent, it is meant that the volume percent of water in the catholyte is greater than the volume percent of any other liquid solvent.

Water has unique properties. In the aqueous sulfur catholyte solutions described herein, the presence of water provides a number of benefits, including high solubility for active sulfur species, including lithium sulfide ($Li_2S$), very high ionic conductivity even at high sulfur concentrations, and fast dissolution kinetics. The combination of high solubility, high conductivity, and fast dissolution kinetics provides compelling lithium sulfur battery performance.

Accordingly, in various embodiments the cell is fabricated with an aqueous catholyte having a high concentration of active sulfur species already dissolved therein. In other words, the cell has a significant amount of dissolved active sulfur species adjacent the electron transfer medium even before the cell has been initially operated (e.g., initially discharged and/or initially charged), and by this expedient the fast electro-kinetics of solution phase redox can be used to advantage, especially, but not exclusively, for applications that require high current drain immediately upon start up. For instance, in various embodiments, prior to initially operating the cell, the active sulfur concentration of dissolved active sulfur species in the aqueous electrolyte is greater than 0.5 molar sulfur, 1 molar sulfur, 2 molar sulfur, 3 molar sulfur, 4 molar sulfur, 5 molar sulfur, 6 molar sulfur, 7 molar sulfur, 8 molar sulfur, 9 molar sulfur, 10 molar sulfur, 11 molar sulfur, or greater than 12 molar sulfur. Herein and in the claims, by the use of the term "molar sulfur" it is meant the number of moles of sulfur per liter of electrolyte. Moreover, by use of the phrase "just prior to initially operating the cell" or "prior to initial cell operation" it is meant, herein and in the claims, to mean the first (i.e., initial) electrochemical operation activated by the user and in particular it refers to one or the other of cell discharge or cell charge, whichever is caused to occur, by the user, first. In other words, incidental self-discharge (e.g., on storage) does not qualify herein or in the claims as an initial cell operation.

Moreover, because it can be difficult to identify the precise chemical nature of the various active sulfur species existing in the catholyte solution, the composition of the active species in the catholyte (i.e., active catholyte composition) is sometimes expressed herein, and in the claims, in terms of an "active lithium sulfur stoichiometric ratio" or more simply an "active stoichiometric ratio" which is the ratio of active sulfur to active lithium dissolved in the electrolyte, and represented by the general formula $Li_2S_x$. Furthermore, it should be understood that the "active stoichiometric ratio" as used herein is exclusive of any non-active lithium salts and/or non-active sulfur salts that may be added to the electrolyte for any purpose, including, e.g., to enhance lithium ion conductivity in the case of, e.g., a non-active LiCl salt, or a non-active sulfur containing salt such as, e.g., $LiSO_3CF_3$.

Accordingly, in various embodiments, the active lithium sulfur stoichiometric ratio in the catholyte prior to, in particular just prior to, initial cell operation is $Li_2S$; $Li_2S_x$ ($x>1$); $Li_2S_x$ ($1<x\leq5$); $Li_2S_x$ ($4<x<5$); $Li_2S_x$ ($3<x<4$); $Li_2S_x$ ($2<x<3$); $Li_2S_2$; $Li_2S_3$; $Li_2S_4$; $Li_2S_5$; or $Li_2S_x$ ($x>5$), and the concentration of the dissolved active sulfur species is typically significant, e.g., greater than 1 molar sulfur. For instance, in particular embodiments, especially for cells using a lithium metal or lithium alloy as the electroactive anode material, the active stoichiometric ratio just prior to initial cell operation is $Li_2S_x$ with the following range for x: $2\leq x\leq 5$, and the active sulfur concentration is between 10 to 17 molar sulfur. For example, a catholyte composition having an active stoichiometric ratio of about $Li_2S_4$, and at concentrations greater than 10 molar sulfur (e.g., 11, 12, 13, 14, 15, 16 or 17 molar sulfur). In another particular embodiment, especially useful for cells which are fabricated in the fully or mostly discharged state (e.g., having an anode electroactive material that is devoid of active lithium), the active stoichiometric ratio of the catholyte just prior to initial cell operation is $Li_2S$, and the active sulfur concentration is typically greater than 1 molar sulfur, and preferably greater than 2 molar sulfur, and more preferably greater than 3 molar sulfur (e.g., 3 molar, 4 molar, or 5 molar sulfur).

Another advantage of the aqueous catholyte is that it may serve as a medium into which high concentrations of fully or partially reduced active sulfur species (e.g., $Li_2S$) may be quickly dissolved during charge. By this expedient high capacity cells in accordance with embodiments of the instant invention may be deeply discharged repeatedly since the cell reaction product on discharge (e.g., $Li_2S$) is readily dissolved and therefore more readily oxidized on charge. Thus, in various embodiments, the cell is formulated and operated such that a significant portion of the sulfur ampere-hour capacity, at the end of discharge, is present in the form of solid phase lithium sulfide.

Furthermore, the combination of high solubility and fast dissolution kinetics of $Li_2S$ in water also enables a practical method of making an aqueous lithium sulfur cell that is assembled in the fully discharged state, and which makes use of alternative anode electroactive materials that are different than that of lithium metal, such as carbon intercalation materials, metals, semi-metals, intermetallics and alloys thereof (e.g., silicon) capable of reversibly inserting (e.g., alloying) and de-inserting (de-alloying) lithium and combinations thereof such as carbon silicon composites. For example, one method in accordance with the present invention involves: i) providing an anode devoid of active lithium (e.g., a carbon intercalation anode) in the fully discharged state (i.e., entirely un-intercalated); ii) providing an aqueous sulfur catholyte comprising water and dissolved lithium sulfide; iii) providing a cathode comprising an electron transfer medium for electrochemical oxidation of dissolved lithium sulfide; iv) configuring the anode, catholyte and cathode into a battery cell; and iv) charging the battery cell. Accordingly, in various embodiments the instant cell comprises both dissolved lithium sulfide and a significant amount of solid phase lithium sulfide in contact with the aqueous electrolyte. For instance, in various embodiments the molar quantity of active sulfur as solid phase lithium sulfide is greater than that of active sulfur dissolved in the electrolyte by a factor of at least 2, or at least 3, or at least 5 or at least 10. Moreover, in the same or separate embodiments, the full charge capacity of the cell just prior to initial cell operation is derived from the ampere-hour capacity of dissolved active sulfur species in the catholyte combined with the ampere-hour capacity of solid phase lithium sulfide. Furthermore, in the same or separate embodiments upon cell fabrication and just prior to initial cell operation the anode electroactive material is substantially devoid of active lithium, and the initial cell operation is to charge the battery. For example, the anode electroactive material may be an intercalation material capable of electrochemically intercalating lithium upon electro-reduction in the presence of lithium ions, or an alloying material capable of electrochemically alloying with lithium upon electro-reduction in the presence of lithium ions, or a material capable of forming a lithium intermetallic phase upon electro-reduction in the presence of lithium ions. For example, in particular embodiments the anode electroactive material is an intercalating carbon, silicon, or a composite of said silicon and carbon.

In applications where high pulse power and size are paramount performance benefit may be gained by taking advantage of the facile electro-kinetics of solution phase redox in combination with the high solubility of polysulfide species in water. For instance, in various embodiments, the cell is formulated and operated such that the ampere-hour capacity in the cell, at full state of charge, is solely present as dissolved active sulfur species in the catholyte. In particular the cell may be fabricated in the fully charged state devoid of solid phase active sulfur (e.g., devoid of elemental sulfur).

The use of water as a catholyte solvent clearly provides considerable benefit, but it also presents significant challenges in a lithium-sulfur battery. In particular, the use of water is constrained by its reactivity with electroactive lithium materials (e.g., lithium metal). Accordingly, the present invention makes use of lithium anode structures wherein the electroactive lithium is isolated from contacting the aqueous sulfur catholyte. In various embodiments, a protected lithium electrode is employed which contains a lithium electroactive material protected from the external environment by a substantially impervious lithium ion conductive protective membrane architecture. Thus in accordance with the instant invention the aqueous catholyte is disposed in the cell such that it directly contacts the electron transfer medium but does not contact the electroactive material of the anode (e.g., lithium metal or carbon intercalation material).

A further challenge to the use of water in a lithium-sulfur cell is the hydrolysis of dissolved lithium sulfide ($Li_2S$) in the catholyte and the resulting generation of hydrogen sulfide ($H_2S$). According to some embodiments of the present invention, a lithium-sulfur cell can comprise a housing configured to contain and withstand the pressure of such gas generation to maintain cell integrity and safety. According to further embodiments, the pH of the electrolyte (catholyte) can be adjusted to reduce or prevent $Li_2S$ hydrolysis. This is particularly achieved with basic pHs, for example greater than 7, or from about 9 to 12 and up to 14. However, the invention is not limited to basic electrolytes, and it is contemplated herein that the pH may be adjusted to values below pH 7 (i.e., acidic) or about pH 7 (i.e., neutral catholyte) using acidic salts and buffering agents.

Further relating to suitable electrolyte/catholyte formulations in accordance with the present invention, compositions and methods are provided to enhance contact between the aqueous electrolyte and the cathode electron transfer medium, for example an electronically conductive matrix such as a carbon or metal mesh, foam or other high surface area, typically porous, structure. Such improved contact enhances utlilization and rate performance of the cell. Electrolyte/catholyte compositions in this regard can include a surfactant to wet the catholyte to the conductive matrix. Also or alternatively, the matrix can be surface treated prior to contact with the electrolyte to enhance wetting, for example being soaked in a wetting agent, followed by displacement of the wetting agent with the aqueous catholyte solution of polysulfides. Still further in this regard, the catholyte may include dissolved organosulfur as a cathode active material. The organosulfur compound or compounds can self-wet to the cathode electron transfer matrix.

Another aspect of the present invention relates to the challenge presented in an aqueous lithium-sulfur battery with regard to the voltage stability window of water and the active sulfur (e.g., dissolved polysulfide) redox potentials. In order to expand the redox potential window in which an aqueous lithium-sulfur battery cell may operate without generating hydrogen and oxygen from the water in the electrolyte, battery cells in accordance with embodiments of the present invention may include a material with a high overpotential for hydrogen ($H_2$) and/or oxygen ($O_2$) in the cathode, in particular as or as part of the electron transfer medium of the cathode. For example, a cathode matrix can be formed from a metal with a high overpotential for $H_2$, such as lead (Pb). Or, a metal with a high overpotential for $H_2$ (and/or $O_2$) can be coated as an exterior layer on an underlying matrix structure (also sometimes referred to herein as a "core" or "core structure"). In some such embodiments, the underlying matrix structure can be an electronic insulator (e.g., a glass or polymer) so that discontinuities in the coating do not result in the generation of hydrogen (or oxygen) gas at an underlying conductor's surface. By providing a cathode electron transfer medium with a high overpotential for $H_2$ and/or $O_2$ battery cells in accordance with the present invention have an extended operating potential range, beyond that of the potential window of water.

Yet another aspect of the present invention relates to compositions defining the exterior surface of the cathode electron transfer medium (e.g., matrix) that electro-catalyze sulfur redox but also have a high overpotential for $H_2$, such as metal sulfides (e.g., lead sulfide, cadmium sulfide, cobalt sulfide and nickel sulfide) and in this way can provide both catalysis and high overpotential for $H_2$ as described above. Such coatings should allow effective electron tunneling so as not to disrupt the electron transfer function of the matrix. The coatings may be applied to a conventional conductive matrix material, such as carbon, or to a matrix material having a high overpotential for $H_2$, such as described above.

In yet another aspect the present invention relates to cell embodiments having catholyte formulations including the incorporation of one or more non-aqueous solvents for particular benefit. Non-aqueous solvents suitable for use herein to improve performance of the instant aqueous lithium sulfur battery cells include aprotic and protic organic solvents and ionic liquids.

In particular embodiments the aqueous catholyte comprises water and a protic solvent that is non-aqueous, especially protic organic solvents that are capable of dissolving a significant amount of $Li_2S$ (e.g., methanol). Addition of the non-aqueous protic solvent is particularly useful in cells that may be operated at temperatures below the freezing temperature of water and yet still require high solubility for lithium sulfide. Accordingly, in various embodiments the catholyte is formulated with an amount of a non-aqueous protic solvent (e.g., ethylene glycol) sufficient to achieve a freezing point temperature (i.e., melt temperature) below a desired value; for example, below −5° C., −10° C., −20° C., −30° C. or −40° C.

While the invention has generally been described with reference to embodiments having electroactive catholyte (i.e., a catholyte containing dissolved active sulfur species) and/or electroactive fully reduced solid phase lithium sulfide loaded in the cathode, the invention is not limited as such, and embodiments are contemplated herein that have fully oxidized solid phase electroactive sulfur (e.g., elemental sulfur) or active organosulfur compounds incorporated in the cell during fabrication as an exclusive source of active sulfur or in combination with an electroactive sulfur catholyte. Notwithstanding the aforementioned sulfur containing cathode configurations, in various embodiments the cell is fabricated absent elemental sulfur, and the cathode is, thereby, devoid of elemental sulfur just prior to initial cell operation.

The invention also relates to methods of manufacture of aqueous lithium-sulfur battery cells. In one aspect, such a method involves de-oxygenating the catholyte and forming and sealing the cell in an inert or reducing environment devoid of molecular oxygen (e.g., a nitrogen environment) in order to reduce or eliminate free oxygen ($O_2$) in the catholyte solution. In this way the irreversible oxidation of sulfur species in the aqueous catholyte (e.g., oxidation leading to insoluble thiosulfates) and the resultant loss of active material, is reduced or avoided.

In other aspects the invention relates to a method of operating an aqueous lithium sulfur battery cell to potentials that might otherwise be prohibited by copious decomposition of water. The method including the steps of providing an aqueous lithium sulfur cell such as that described in accordance with the instant invention and having a solid electron transfer medium with a surface that facilitates electrochemical reduction of active sulfur and has a high overpotential for hydrogen evolution, and then electrochemically cycling the cell, including discharging the cell to a cell voltage that approaches, equals or goes beyond that which corresponds to the thermodynamic potential for water decomposition. In various embodiments the instant cells are operated such that during discharge the cell voltage is allowed to reach values below 2.3V, 2.2V, 2.1V, and 2.0V, and even more preferably below 1.8V, below 1.7V, and below 1.5V. In various embodiments the instant cells are embodied with an anode that is devoid of active lithium (e.g., the anode electroactive material is an intercalating or alloying material such as carbon, silicon or a carbon silicon composite).

In various embodiments the instant cells are self-contained and sealed in a hermetic casing wherein the entirety of the cell capacity is derived from electroactive sulfur and electroactive lithium disposed in the casing during cell manufacture. These fully sealed cells may be of the primary or secondary type.

In other embodiments the instant cells are configured in a battery flow cell system, wherein an aqueous sulfur catholyte is caused to flow, and/or circulate, into the cell, and, in various embodiments, through an inter-electrode region between the lithium anode and the cathode electron transfer medium. In some embodiments both the aqueous catholyte and the electroactive lithium are flowable and during operation are caused to flow through the cell.

It should be understood that aqueous lithium-sulfur battery cells in accordance with the present invention are not merely different from conventional non-aqueous Li—S battery cells by their substitution of a non-aqueous electrolyte solvent with an aqueous electrolyte solvent system. The use of water in the electrolyte results in a solvent system that is not just a spectator, but actually participates in the electrochemical reactions at the cathode, reacting to form and dissolve new species. The present invention is therefore directed to an entirely new class of battery cells having entirely different chemistry than conventional Li—S battery cells (as evidenced by the dramatic difference in their voltage profiles), and to the formulation, engineering, operation and manufacturing challenges associated therewith.

These and other aspects of the present invention are described in more detail, including with reference to figures, in the description which follows.

DETAILED DESCRIPTION OF SPECIFIC EMBODIMENTS

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention. In the following description, numerous specific details are set forth in order to provide a thorough understanding of the present invention. The present invention may be practiced without some or all of these specific details. In other instances, well known process operations have not been described in detail so as to not unnecessarily obscure the present invention.

Figure 1:
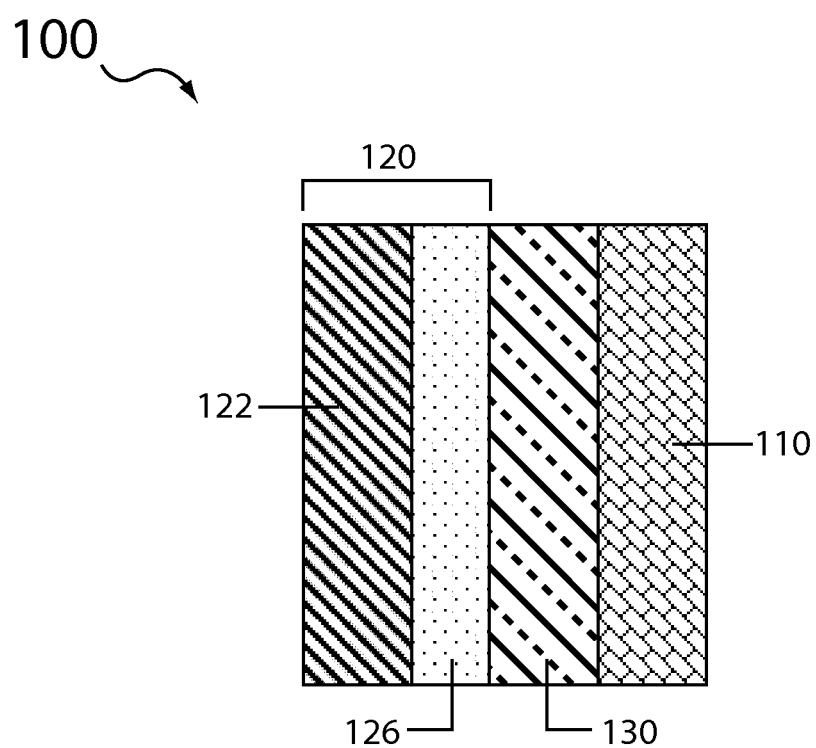
FIG. 1 is a schematic cross section of a battery cell in accordance with various embodiments of the present invention.

A lithium sulfur cell in accordance with various embodiments of the instant invention is shown in FIG. 1. The cell 100 includes a cathode 110 comprising an electron transfer medium, a protected lithium anode 120, an aqueous electrolyte in contact with the electron transfer medium and in various embodiments also in contact with an exterior surface of the protected lithium anode, and active sulfur species in contact with the aqueous electrolyte (e.g., lithium polysulfides, lithium sulfide, lithium hydrosulfide, dissolved therein and/or present in the solid phase (e.g., solid phase $Li_2S$).

The protected lithium anode 120 includes a lithium electroactive material layer 122 and a substantially impervious lithium ion conducting protective membrane architecture 126 on the surface of the lithium active layer 122. The membrane architecture is substantially impervious to water and has a first surface chemically compatible in contact with the lithium electroactive layer and a second surface, opposing the cathode, which is chemically compatible in contact with water, and in particular chemically compatible in contact with the catholyte employed in the cell. In some embodiments the cell further includes a porous separator material layer 130 interposed between the cathode and the protected anode, and containing in its pores at least a portion of the aqueous electrolyte (i.e., aqueous catholyte). In other embodiments the cell is absent a separator and it is contemplated herein that the membrane architecture second surface directly contacts the cathode, which, in said embodiments, is generally porous with catholyte filling the pore spaces.

Figure 2A:
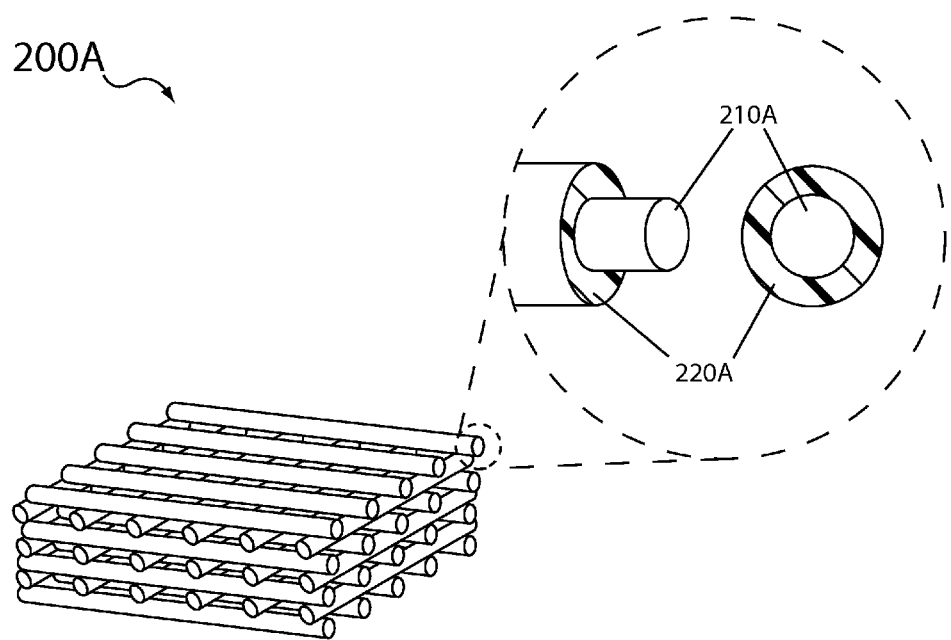
FIGS. 2A-B illustrates an electron transfer medium in accordance with various embodiments of the present invention.
Figure 2B:
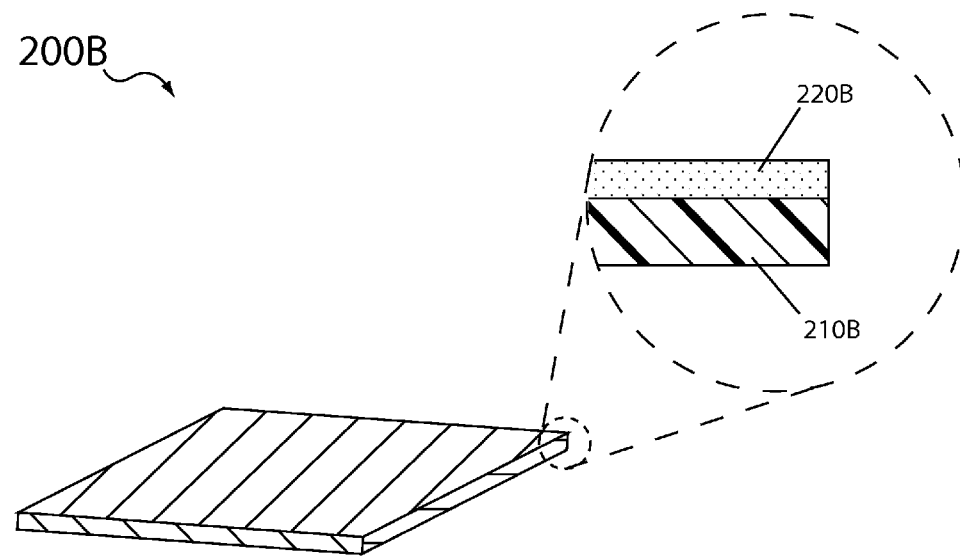

The cathode 110 includes a solid electron transfer medium having an "exterior surface" that is chemically compatible in contact with the catholyte and on which dissolved active sulfur species are electro-reduced during cell discharge and electro-oxidized on charge. With reference to FIGS. 2A-B, in various embodiments the electron transfer medium 200A/200B may be a porous three-dimensional structure 200A or planar 200B and substantially dense or otherwise porous (e.g., a planar mesh). Whether dense or porous, the medium should be sufficiently electronically conductive to support the electrical current through the cell and its exterior surface capable of supporting the electron transfer current. When porous, the solid electron transfer medium may take the form of a porous matrix such as a woven or non-woven fiber network (e.g., a metal or carbon fiber cloth or paper) or a through porous monolithic solid body (e.g., a metal or carbon foam). When planar, the medium may simply be a metal or carbonaceous sheet or foil or open mesh of sufficient thickness and conductivity to be self-supporting, or the planar medium may be a composite having a first layer, typically thin and electronically conductive, that defines the exterior surface and a second layer serving as a substrate support, and optionally further providing current collection when electronically conductive.

The electron transfer medium has an exterior surface that may be porous or dense but is defined, at least in part, by a material that, in contact with the catholyte, facilitates electron transfer, and, in particular, facilitates electrochemical redox of active sulfur species. Continuing with reference to FIGS. 2A-B, in various embodiments the electron transfer medium 200A/200B is a porous matrix composed of a core component (i.e., underlying matrix structure) 210A/210B having an exterior layer component 220A/220B that provides the exterior surface in contact with the catholyte. The core component generally provides substrate support and may, when conductive, facilitate current collection, whereas a primary function of the exterior layer is to provide some benefit to the electrochemical performance, and in particular that pertaining to electron transfer (e.g., facilitating sulfur redox, suppressing water decomposition, or both). The exterior layer may be porous or dense. In various embodiments, a dense exterior layer is also preferably contiguous and therefore substantially covers the core surface in its entirety. In other embodiments, a porous exterior layer is suitable, especially when the surface composition of the core is compatible with the catholyte and does not catalyze hydrogen evolution, as described in more detail below. Furthermore, when porous or dense, the exterior layer may include high surface area particles that electrocatalyze sulfur redox and/or increases the effective surface area for electrical benefit.

In some embodiments the core, electronically conductive, supports current collection, while the exterior layer primarily serves to support and preferably enhance electrochemical sulfur redox. Suitable electronically conductive core materials include metals, preferably of lightweight (e.g., aluminum). In other embodiments the core is electronically insulating and the exterior layer provides electron transfer and is sufficiently conductive so that it may provide some or all of the current collector function. The insulating core may be composed of any suitable insulating material of sufficient mechanical integrity and is preferably although not necessarily chemically compatible in contact with the catholyte. Suitable insulating core materials include, but are not limited to, glasses and polymers. In certain embodiments the exterior layer is dense and substantially free of defects that otherwise would allow water from the electrolyte to seep into contact with the core material, and potentially reduce its strength or mechanical integrity. To prevent this from happening, in preferred embodiments the core material is also chemically compatible in contact with the catholyte and even more preferably is a material that does not swell or lose mechanical strength when in contact with water, and specifically does not mechanically degrade or change shape if exposed to the active electrolyte. In various embodiments additional layers may be incorporated between the insulating or conductive core and the exterior layer to support current collection and/or provide or improve interface compatibility and/or adhesion. For example, the insulating core of an underlying matrix structure may have a first metal coating (e.g., aluminum) serving as an intermediary layer to provide current collection and a second coating covering the aluminum that defines, in whole or in part, the exterior surface for the purpose of facilitating sulfur redox.

The electron transfer medium may be uncatalyzed, relying solely on the medium material (e.g., carbon) to facilitate the electrochemical redox reactions, or, in some embodiments, the electron transfer medium may contain a catalyst on its surface, such as a particulate catalyst or the catalyst may be formed on the underlying carbon or metal matrix as a coating. In some embodiments the exterior layer is a porous high surface area film composed of electronically conductive particles (e.g., high surface area carbons including nano-carbons, carbon blacks and functionalized carbons) that preferably electro-catalyze at least one or both of electro-reduction and electro-oxidation of active sulfur. In other embodiments, as described in more detail below, the exterior layer may be a dense, preferably thin, electronically conductive layer, such as a thin dense film of a metal, metal alloy, or metal compound (e.g., a metal sulfide) for the purposes of providing one or more of electronic conduction, facilitation of sulfur redox, and expansion of the voltage stability window of the catholyte, as described in more detail below.

Figure 3:
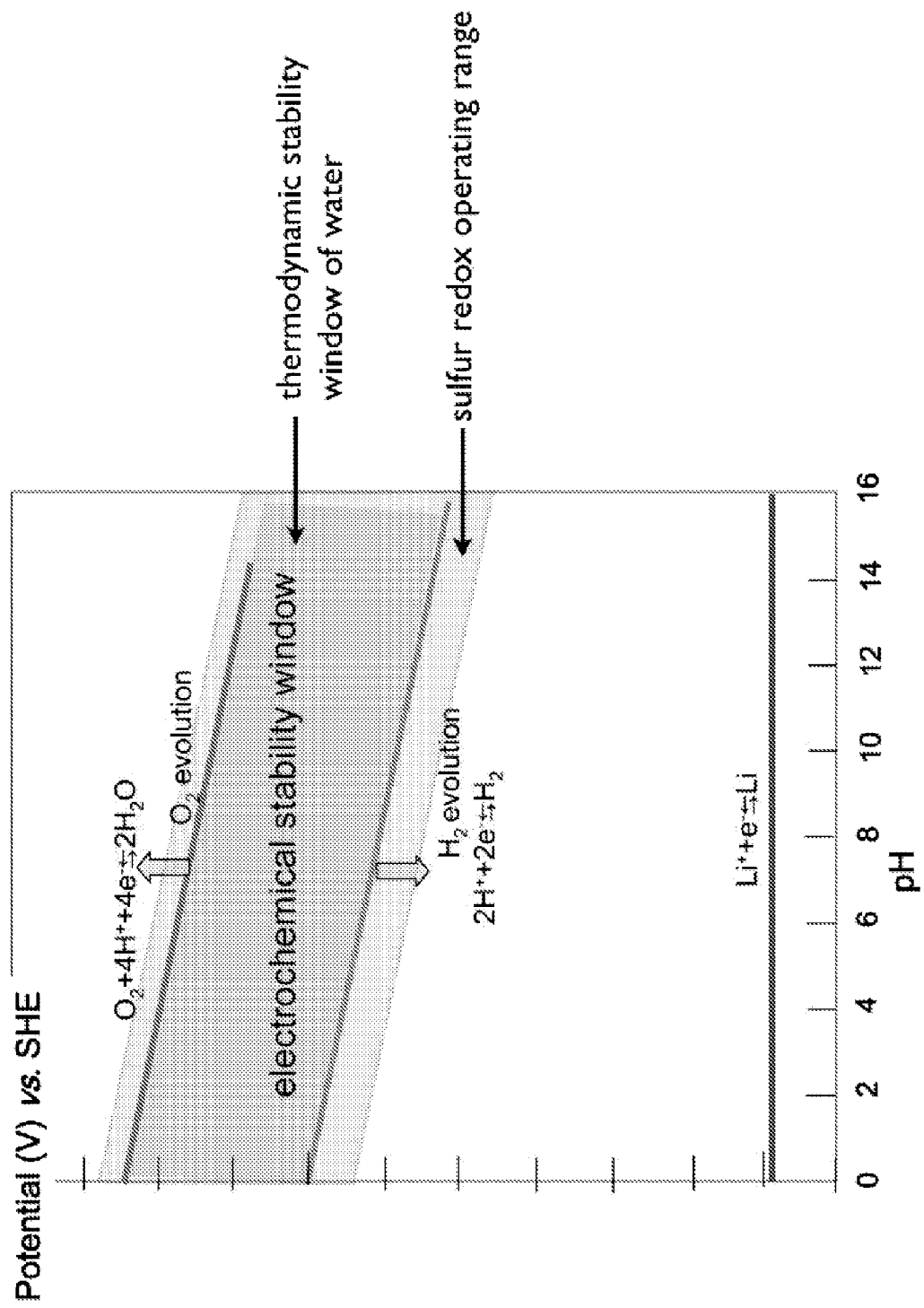
FIG. 3 is a qualitative illustration of a Pourbaix diagram for water and active sulfur species in catholyte in accordance with the present invention.
Figure 4:
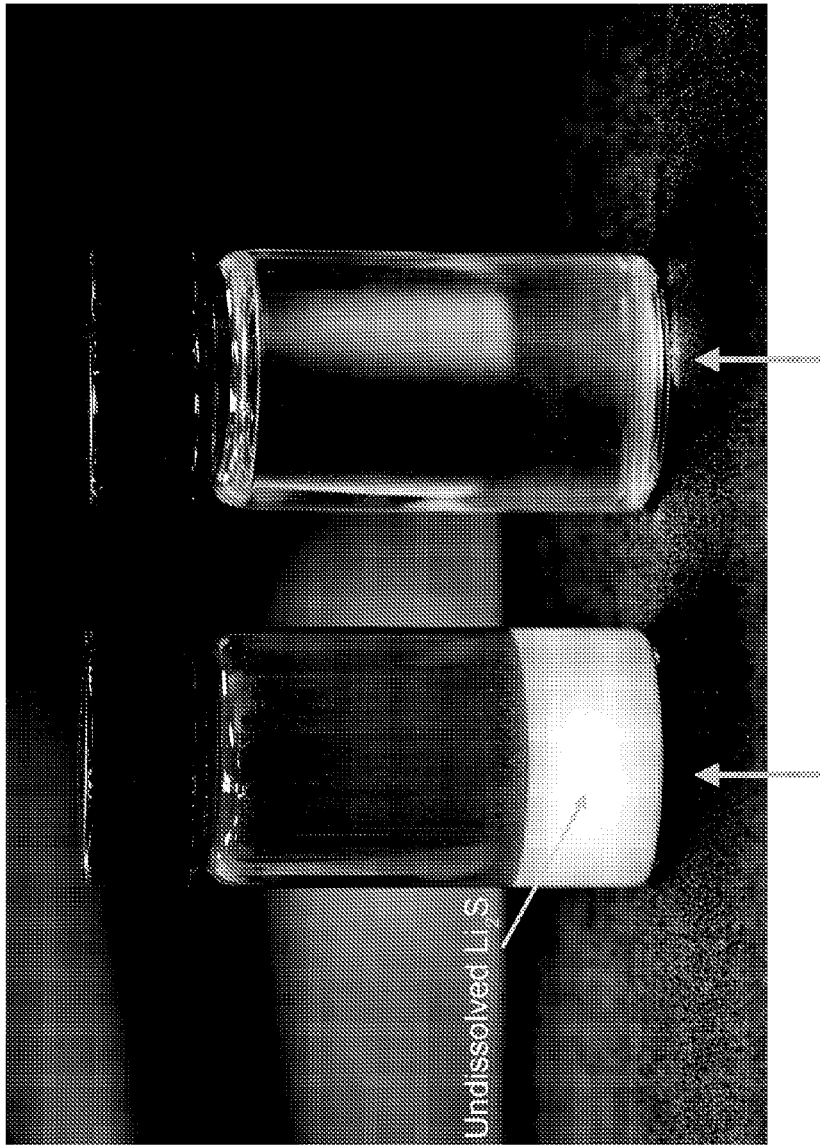
FIG. 4 is a photograph comparing the solubility of $Li_2S$ in water with that in a non-aqueous solvent.

With regard to the voltage window of the catholyte, a significant issue may arise during discharge once the cell voltage drops below a "critical voltage" corresponding to the thermodynamic potential for water reduction, as the cell electrochemistry is made complicated by the potentiality of water decomposition, and in particular $H_2$ evolution. The issue is illustrated pictorially with reference to FIG. 3, showing a Pourbaix diagram of water compared to an illustrative Pourbaix diagram of sulfur redox without assigning voltages to the sulfur electro-reduction/oxidation reactions. As can be seen in the illustration, the critical voltage varies with pH. For instance at pH 12 the critical voltage versus lithium is about 2.3 Volts and decreases with increasing pH values, reaching about 2.2 Volts at pH 14. As illustrated, albeit quite qualitatively, at cell voltages below the voltage stability window of water (i.e., below the critical voltage) there exist significant active sulfur ampere-hour capacity; however, the practicality of harnessing that capacity is complicated by water decomposition.

In this regard, the present invention provides cathode structures having electron transfer mediums that enable the instant cells to be discharged to voltages beyond the thermodynamic potential for water reduction, and thereby efficiently harness the additional ampere-hour capacity which exists at cell voltages below the critical voltage, and preferably do so without evolving any $H_2$. Thus, in various embodiments the instant cells are operated having a discharge voltage cutoff (i.e., the discharge is caused to stop when the cell voltage reaches the voltage cutoff value) that approaches the critical voltage as described above, and in certain embodiments hydrogen evolution is sufficiently suppressed by the electron transfer medium to allow the value of the discharge voltage cutoff to be about that of the critical voltage, and in particular embodiments thereof, the discharge voltage cutoff is a value beyond the critical voltage (e.g., in embodiments the critical voltage may be about 2.4 Volts, 2.3 Volts, 2.2 Volts or about 2.1 Volts and the prescribed cutoff voltage is below that value; for example the voltage cutoff of the cell is about 2.3V, 2.2 Volts, 2.1 Volts, and 2.0 Volts, respectively). Accordingly, in various embodiments, the exterior surface of the electron transfer medium provides at least a dual functionality: a first function to facilitate electrochemical reduction/oxidation of the active sulfur species and a second function to inhibit hydrogen evolution. For example, the exterior surface may be defined in whole or in part by a material that facilitates sulfur redox but has a high overpotential for $H_2$ evolution. By this expedient the cell may be efficiently discharged to voltages below the critical voltage without evolving $H_2$. Preferably the exterior surface has an overpotential of at least 50 mV beyond the thermodynamic potential of water reduction, and in embodiments disclosed herein the overpotential is beyond 100 mV, beyond 200 mV, beyond 300 mV, beyond 400 mV, beyond 500 mV, beyond 600 mV, and in certain embodiments beyond 700 mV and beyond 800 mV. For instance, with regard to cell voltages, the use of a high overpotential electron transfer medium allows aqueous lithium sulfur cells of the instant invention to be discharged to cell voltages below 2.4 V, preferably below 2.3 V, even more preferably below 2.2V, below 2.1V and yet even more preferably below 2.0 V, below 1.9 V, below 1.8 V, below 1.7 V, below 1.6 V and below 1.5V.

Accordingly, in various embodiments at least a portion and in certain embodiments the entirety of the exterior surface of the electron transfer medium is defined by a material having a high overpotential for $H_2$ evolution. Suitable classes of such materials include metals, metal alloys (e.g., amalgams), and metal compounds such as metal chalcogenides, especially metal sulfides. Particularly suitable metals include lead, cadmium, indium, nickel, gallium, tellurium, manganese, and zinc, or some combination thereof. Particularly suitable metal alloys include amalgams. Particularly suitable metal sulfides include cobalt sulfide, copper sulfide, nickel sulfide, and zinc sulfide, or some combination thereof. The thickness of the exterior layer is a tradeoff between burdening the cell with extra weight and other considerations such as one or more of the composition of the core material, mechanical strength, conductivity and coating process. For instance, in embodiments the exterior layer thickness may be in the range of 50 microns to values below 1 micron (e.g., about 0.5 microns or 0.25 microns). The composition of the exterior layer (e.g., that which includes metal sulfide) may be varied across its thickness, either gradually or discretely. For example, the exterior layer may be formed in two steps, first the metal of the metal sulfide may be coated, directly or indirectly, onto the core component surface, and then the metal layer sulfidized to form a thin layer of metal sulfide, which in embodiments may be thin and dense, for example less than 10 nm, e.g., about 5 nm, about 2 nm or about 1 nm. Such thin films are also self-healing in that if a portion of the metal sulfide film were to flake off or start cracking, the underlying metal layer surface would subsequently react with sulfur in the catholyte to reform the sulfide film.

In a particular embodiment the porous electron transfer medium is composed of a core component (e.g., a glass or polymer fiber mat) and a metal sulfide exterior layer (e.g., cobalt sulfide or lead sulfide). The core component may be electronically insulating, and the metal sulfide formed by first applying a layer of the metal of the sulfide on the core (e.g., coating the core with lead) and then sulfidizing the metal coated core surface via treatment in a sulfur containing environment. Thus depending on the method of sulfidization, the exterior layer may be entirely composed of the metal sulfide (e.g., lead sulfide) or a combination of the metal (e.g., lead) and metal sulfide (e.g., lead sulfide). The metal layer may be applied using coating methods applicable for both electronically conductive and insulating core structures, as are known in the art generally, including evaporation, dip coating from the melt, electro-deposition and electro-less deposition. Alternatively, the core component may itself be composed of a material with a high overpotential for $H_2$ (e.g., a porous lead or porous cobalt matrix). However, the use of a heavy metal core material may unduly burden the overall cell weight, so in preferred embodiments the core material is composed of a material of light weight and preferably low density, such as carbon (e.g., graphitic like fibers or carbon foams), light weight metals such as aluminum, or inorganic materials such as silica or other glasses, or organic materials such as polymers (e.g., polymer fibers) which preferably are not swelled by water (e.g., the polymer core composed of polypropylene, polyethylene, or a combination thereof). Hollow cores are also contemplated herein for providing an exceptional lightweight advantage. Carbon is a particularly useful core material as it can be fabricated into a number of porous formats including porous fiber matrices and foams, and is also electronically conductive and thus capable of supporting current collection, which enables the use of exceptionally thin exterior layers. For example, less than 5 micron thick, preferably less than 1 micron, and even more preferably less than 0.5 micron, and yet even more preferably the thickness of the exterior layer is less than 0.25 microns. In the same or separate embodiments, especially when the core is electronically insulating, an intermediate electronically conductive layer, such as a metal, semi-metal, or metal compound, (e.g., an aluminum layer) may be applied as a coating between the core and the exterior layer to provide current collection support, or the exterior layer itself may be of sufficient thickness to support the electrical current. For instance an intermediate metal layer such as aluminum having thickness between 0.25 microns and 10 microns, and more preferably between 0.5 microns and 5 microns; for example, about 0.5 microns, about 1 micron, about 2 microns, about 3 microns, about 4 microns, and about 5 microns. Thereafter the exterior layer applied to the surface of the intermediary layer using one or more of the aforementioned coating techniques, or other coating techniques generally known in the arts.

In various embodiments, the composition of the exterior surface may be modified via surface treatments, and in particular, sulfidization to form a sulfide composition suitable for supporting, and preferably, electro-catalyzing sulfur redox. The step of sulfidization may be carried out in-situ within the cell by using a sulfur based catholyte. And while in-situ processing has the clear advantage of simplicity, it also leads to a concomitant loss in active sulfur cell capacity, since at least some of the sulfur that would have otherwise provided cell capacity is consumed by the sulfidization treatment, and for high surface area porous matrix structures, the loss of active sulfur capacity can be significant. Accordingly, in preferred embodiments, especially useful for sulfidizing porous matrix structures but not limited as such and thus also includes sulfidizing planar and/or dense core structures, the sulfidization step is carried out ex-situ in a sulfur environment remote from the cell. For instance, the core material composed of the metal of the metal sulfide, or a core component coated with said metal may be placed in a bath of an aqueous lithium polysulfide solution similar to or identical in nature to the catholyte utilized in the cell, and allowed to stand in the bath for a time sufficient to form a suitable metal sulfide film, and preferably one which is substantially dense and pore free.

Continuing with reference to FIG. 1 the cathode 110 may be assembled in the cell devoid of elemental solid sulfur, and the entirety of the sulfur capacity loaded into the cell via the catholyte in the form of dissolved active sulfur species or via solid phase active sulfur species such as typically $Li_2S$ or some combination of dissolved active sulfur (e.g., dissolved $Li_2S$) and solid phase $Li_2S$. Alternatively, the cathode may include some form of solid elemental sulfur, including crystalline sulfur, amorphous sulfur, precipitated sulfur, and sulfur solidified from the melt. Elemental sulfur includes the various polyatomic molecules of sulfur, especially the octa-sulfur allotrope characterized as cyclo-$S_8$ ring, and polymorphs thereof such as α-octasulfur, β-octasulfur, and γ-octasulfur. For example, elemental sulfur (in the form of sulfur particulates including nano-sized sulfur particles) may be incorporated in the cell as a material component of the cathode, wherein, e.g., the sulfur may be admixed with high surface area or activated carbon particles and an appropriate binder (PTFE, PvDF and PEO) for adhering the material components in a suitable liquid carrier for formulating a slurry to be coated onto or impregnated into the porous matrix structure. Slurry formulations, with or without solid elemental sulfur, and coating methods suitable for use herein for incorporating solid phase active sulfur into the cathode are described in U.S. Pat. Nos. 6,030,720, 6,200,704, and 6,991,662, each of which is hereby fully incorporated by reference for all that they describe, and in particular for the slurry formulations and coating methods described. In the same or separate embodiments the active sulfur in the cathode may be or further include electroactive organosulfur compounds, including those described in U.S. Pat. Nos. 4,833,048; 4,917,974; 5,162,175; 5,516,598, hereby fully incorporated by reference, in particular for their disclosure relating to organosulfur compound composition and use.

In alternative embodiments, the cells may be assembled having all of the sulfur capacity loaded in the cathode, e.g., in the form of elemental sulfur. In other embodiments, sulfur is present in the cathode as a solid phase electroactive material as well as in the aqueous catholyte in the form of dissolved polysulfide species. In some embodiments the cell is assembled using a cathode that is loaded with solid phase $Li_2S$, and by this expedient, the cell may be assembled in the fully or partially discharged state, wherein all or a portion of the active lithium is stored in or nearby the cathode during cell assembly. The as assembled cell is then subsequently charged, e.g., to full charge capacity, prior to initial discharge. Embodiments in accordance with this aspect of the instant invention are described in further detail below, and in particular in the section entitled Aqueous Lithium Sulfur Cells Assembled in the Discharged State.

In various embodiments a significant amount of the lithium and sulfur capacity is present in the cell prior to initial cell operation, and is in the form of a fully or highly reduced solid lithium sulfur material; for instance, in the form of solid phase $Li_2S$. The solid phase $Li_2S$ loaded typically in contact with the catholyte such that concomitant with cell charging solid phase lithium sulfide will dissolve into the catholyte. In embodiments the amount of solid phase lithium sulfide present in the cell prior to initial cell operation is of an amount which provides more active sulfur than that already dissolved in the catholyte. For instance, the following embodiments are contemplated wherein the weight of water in the catholyte relative to the weight of active solid phase lithium sulfide (e.g., $Li_2S$) pre-loaded in the cell corresponds to the following ratio (R): $R \leq 10$, $R \leq 6$, $R \leq 5$, $R \leq 4$, $R \leq 3$, $R \leq 2$ and $R \leq 1.5$. In particular embodiments, the cell is fabricated with said ratio in accordance with the following ranges: $[1.15 \leq R < 1.7]$; $[1.7 \leq R < 2.3]$; $[2.3 \leq R < 2.9]$; $[2.9 \leq R < 3.5]$; $[3.5 \leq R < 4.0]$; $[4.0 \leq R < 5.0]$; $[5.0 \leq R < 7.0]$; and $[7.0 \leq R < 10.0]$.

Aqueous Sulfur Catholyte

In accordance with the instant invention, the aqueous catholyte contains a significant amount of water (i.e., not merely a trace amount), and the catholyte is disposed in the cell such that it directly contacts the cathode. In certain embodiments water serves as the main liquid solvent of the sulfur catholyte (i.e., electrolyte in contact with the sulfur cathode), and in particular embodiments water is the only catholyte solvent.

In accordance with the instant invention a significant (non-trace) amount of water is incorporated in the catholyte. In various embodiments the volume percent of water in the catholyte relative to the total liquid solvent volume is greater than 5%, 10%, 20%, 30%, 40%, 50%, 60%, 70%, 80%, and greater than 90%. In certain embodiments water is the only liquid solvent in the catholyte, and in particular embodiments thereof water is the only liquid solvent (i.e., water constitutes 100% of the solvent volume of the catholyte). In various embodiments water is the main solvent in the catholyte.

Water has unique properties. In aqueous sulfur catholyte solutions, water chemically interacts with the active sulfur species to provide a number of benefits. In various embodiments the water serves as a medium into which a large concentration of active sulfur species may be dissolved (e.g., including sulfide anion ($S^{2-}$), polysulfide anion ($S_x^{2-}$ with $x>1$), hydrosulfide anion (HS), polyhydrosulfide anion ($HS_x^-$ with $x>1$) and combinations thereof). In various embodiments, the catholyte composition just prior to initially operating the cell, which is typically the catholyte composition upon cell fabrication and sealing, includes a significant concentration of dissolved active sulfur species. For instance, an active sulfur concentration in the catholyte of greater than 0.5 molar sulfur, greater than 1 molar sulfur, greater than 2 molar sulfur, greater than 3 molar sulfur, greater than 4 molar sulfur, greater than 5 molar sulfur, greater than 6 molar sulfur, greater than 7 molar sulfur, greater than 8 molar sulfur, greater than 9 molar sulfur, greater than 10 molar sulfur, greater than 11 molar sulfur, greater than 12 molar sulfur, greater than 13 molar sulfur, greater than 14 molar sulfur, greater than 15 molar sulfur, greater than 16 molar sulfur or greater than 17 molar sulfur may be used.

Moreover, because it can be difficult to identify the precise chemical nature of the various active sulfur species existing in the catholyte solution at any given time during the course of discharge or charge, the composition of the active species in the catholyte is sometimes expressed herein, and in the claims, in terms of an "active stoichiometric ratio" which is the ratio of active sulfur to active lithium dissolved in the electrolyte, and that ratio is represented by the general formula $Li_2S_x$. Furthermore, it should be understood that the "active stoichiometric ratio" as used herein is exclusive of any non-active lithium salts and/or non-active sulfur salts that may be added to the electrolyte for any purpose, including, e.g., to enhance lithium ion conductivity in the case of e.g., a non-active LiCl salt, or a non-active sulfur containing salt such as, e.g., $LiSO_3CF_3$.

Accordingly, in embodiments, the catholyte, just prior to initially operating the cell, has an active stoichiometric ratio of $Li_2S$; $Li_2S_x$ (x>1); $Li_2S_x$ (1<x≤5); $Li_2S_x$ (4<x<5); $Li_2S_x$ (3<x<4); $Li_2S_x$ (2<x<3); $Li_2S_2$; $Li_2S_3$; $Li_2S_4$; $Li_2S_5$; or $Li_2S_x$ (x>5). For example, an active stoichiometric ratio of about $Li_2S$, about $Li_2S_2$, about $Li_2S_3$, about $Li_2S_4$, and about $Li_2S_5$.

In various embodiments, the lithium sulfur cells of the instant invention include an aqueous catholyte having a high concentration of dissolved active sulfur species. In embodiments, the sulfur concentration of active sulfur species in the catholyte is greater than 0.5 molar sulfur, greater than 1 molar sulfur, greater than 2 molar sulfur, greater than 3 molar sulfur, greater than 4 molar sulfur, greater than 5 molar sulfur, greater than 6 molar sulfur, greater than 7 molar sulfur, greater than 8 molar sulfur, greater than 9 molar sulfur, greater than 10 molar sulfur, greater than 11 molar sulfur, greater than 12 molar sulfur, greater than 13 molar sulfur, greater than 14 molar sulfur, greater than 15 molar sulfur, greater than 16 molar sulfur or greater than 17 molar sulfur.

In particular embodiments, the active lithium sulfur stoichiometric ratio in the catholyte just prior to initial cell operation is $Li_2S$; $Li_2S_x$ (x>1); $Li_2S_x$ (1<x≤5); $Li_2S_x$ (4<x<5); $Li_2S_x$ (3<x<4); $Li_2S_x$ (2<x<3); $Li_2S_2$; $Li_2S_3$; $Li_2S_4$; $Li_2S_5$; or $Li_2S_x$ (x>5), and the concentration of the dissolved active sulfur species is typically significant, e.g., greater than 1 molar sulfur. For instance, in particular embodiments, especially for cells using a lithium metal or lithium alloy as the electroactive anode material, the active stoichiometric ratio just prior to initial cell operation is $Li_2S_x$ with the following range for x: 2×5, and the active sulfur concentration is between 10 to 17 molar sulfur. For example, a catholyte composition having an active stoichiometric ratio of about $Li_2S_4$, and at concentrations greater than 10 molar sulfur (e.g., 11, 12, 13, 14, 15, 16 or 17 molar sulfur) may be used. In another particular embodiment, especially useful for cells which are fabricated in the fully or mostly discharged state (e.g., having an anode electroactive material that is devoid of active lithium), the active stoichiometric ratio of the catholyte just prior to initial cell operation is $Li_2S$, and the active sulfur concentration is typically greater than 1 molar sulfur, and preferably greater than 2 molar sulfur, and more preferably greater than 3 molar sulfur (e.g., 3 molar, 4 molar, or 5 molar sulfur).

Of particular note is the high solubility and facile dissolution of $Li_2S$ (lithium sulfide) in water. In non-aqueous aprotic solvents lithium sulfide solubility is severely limited, and $Li_2S$ is generally considered to be insoluble. Water is shown herein to provide an excellent solvent for lithium sulfide ($Li_2S$), and this feature is used for advantage in various embodiments of the instant invention in order to achieve high ampere-hour (Ah) capacity per unit volume of catholyte, and ultimately high cell energy density as well as improved reversibility on deep discharge. A visual comparison is provided in FIG. 5, illustrating that water has at least a 1000 fold greater solubility for $Li_2S$ than that of tetraglyne (a common non-aqueous solvent employed in conventional non-aqueous Li/S cells).

Accordingly, in various embodiments the aqueous catholyte serves as a medium into which high concentrations of $Li_2S$ dissolve. Thus, by this expedient, aqueous lithium sulfur cells yielding a high ampere-hour capacity per unit volume of catholyte can be realized, and these high capacity cells may be deeply discharged repeatedly since the reaction product (e.g., $Li_2S$) is readily dissolved and therefore more readily oxidized on charge. Thus, in various embodiments, at the end of discharge a significant portion of the sulfur ampere-hour capacity is present in the cell in the form of solid phase discharge product (e.g., $Li_2S$). For instance, in embodiments, the end of discharge ratio comparing the number of moles of sulfur as solid phase sulfur (e.g., $Li_2S$) to the number of moles of sulfur dissolved in the catholyte (e.g., as $Li_2S$) is greater than 2; greater than 3; greater than 5, or greater than 10.

Furthermore, the combination of high solubility and fast dissolution kinetics of $Li_2S$ in water also enables a practical method of making an aqueous lithium sulfur cell that is assembled in the fully discharged state, and which makes use of alternative lithium electroactive materials that are different than that of lithium metal, such as carbon intercalation materials, alloys (e.g., of silicon) and combinations thereof such as carbon silicon composites. For example, one method in accordance with the present invention involves: i) providing a carbon anode in the fully discharged state (i.e., entirely un-intercalated); ii) providing an aqueous polysulfide catholyte comprising water and dissolved lithium sulfide; iii) providing a cathode comprising an electron transfer medium for electrochemical oxidation of dissolved lithium sulfide; iv) configuring the anode, catholyte and cathode into a battery cell; and iv) charging the battery cell.

Whereas the fast dissolution kinetics of $Li_2S$ enables repeated deep discharge, additional benefit may be gained by taking advantage of the facile electro-kinetics of solution phase redox in combination with the high solubility of polysulfide species in water. Thus, in various embodiments, the cell is formulated such that at full state of charge the catholyte contains a high concentration of dissolved active sulfur species, and in certain embodiments the cell is formulated and operated such that the ampere-hour capacity of sulfur in the cell at full state of charge is solely present as dissolved species in the catholyte.

Without intending to be limited by theory, lithium sulfide dissolution in water involves hydrolysis that is believed to take place in accordance with the following equilibrium:

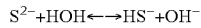

$$S^{2-}+HOH \longleftrightarrow HS^-+OH^-$$

Thus the pH of highly concentrated aqueous catholyte solutions of $Li_2S$ dissolved in water is generally quite high and typically greater than pH 10, and more typically greater than pH 11 or even higher, e.g., about pH 12, about pH 13, or about pH 14. However, the invention is not exclusively limited to cells having an aqueous sulfur catholyte of such high pH, as the pH may be tailored using pH adjusting additives, including basic salts (e.g., LiOH), acidic salts (e.g., HCl) and buffering agents as are known to those of skill in the art. Thus, in various embodiments the catholyte may be formulated having a pH that renders it acidic (i.e., pH<7), basic (i.e., pH>7), or neutral (pH about 7).

The aqueous catholyte may further comprise a supporting lithium salt to maintain a consistent and high conductivity over the entire discharge and/or improve stability. Typically the supporting salt concentration is in the range of 0.05 to 1.5 moles/liter (e.g., about 0.25 moles/liter). Examples of suitable supporting salts include a variety of lithium cation salts. For instance, lithium halides (e.g., LiCl, LiBr), $LiSO_3CF_3$, $LiN(CF_3SO_2)_2$ and $LiN(SO_2C_2F_5)_2$. Typically present in the catholyte to a concentration of about 0.05 to 1.5 molar lithium, e.g., 0.1, 0.2, 0.3, 0.4, 0.5, 0.6, 0.7, 0.8, 0.9, or 1.0 molar lithium.

Electroactive aqueous catholytes in accordance with the instant invention comprise water and an active sulfur species dissolved therein. In various embodiments the active sulfur species are formed in the catholyte by reacting one or more precursor materials with each other and/or with water. In one embodiment a first precursor of lithium sulfide and a second precursor of elemental sulfur are reacted in stoichiometric amounts in the presence of water to yield active sulfur species in solution. Preferably, to mitigate the undesirable formation of insoluble products of oxidation (e.g., thiosulfates), the water should be deoxygenated (i.e., the water should be substantially devoid of molecular oxygen), which may be carried out by any suitable method known in the art, including boiling of the water and/or purging the water with an oxygen free gas, such as nitrogen. The purging step continued until the desired level of oxygen has been reached. For instance, the concentration of molecular oxygen in the catholyte is preferably less than 1000 ppm, and more preferably less than 500 ppm and even more preferably less than 100 ppm, or less than 50 ppm or even 10 ppm.

In various embodiments the aqueous catholyte further comprises one or more non-aqueous solvents. In various embodiments the volume percent of non-aqueous solvents in the catholyte ranges from about 1% to as much as 90% by volume; for example, between 1% and 10%, between 10% and 20%, between 20% and 30%, between 30% and 40%, between 40% and 50%, between 50% and 60%, between 60% and 70%, between 70% and 80%, between 80% and 90%.

Non-aqueous solvents suitable for use herein to improve performance include aprotic and protic organic solvents (solids and liquids, typically liquids or solid polyethylene oxide) and ionic liquids. In particular, in some embodiments protic organic solvents may be used.

Examples of suitable non-aqueous aprotic and protic solvents include ethers (e.g., 2-Methyltetrahydrofuran (2-MeTHF), Tetrahydrofuran (THF), 4-Methyldioxolane (4-MeDIOX), Tetrahydropyran (THP) and 1,3-Dioxolane (DIOX)) glymes (e.g., 1,2-dimethoxyethane (DME/monoglyme), di-glyme, tri-glyme, tetra-glyme and higher glymes), carbonates (e.g., cyclic carbonates such as propylene carbonate (PC), ethylene carbonate (EC), acyclic carbonates such as dimethyl carbonate (DMC), ethylmethyl carbonate (EMC) and diethyl carbonate (DEC), formates (e.g., Methyl Formate) and butyrolactone (GBL). Other suitable aprotic solvents include those having a high donor number (i.e., donor solvents) such as hexamethylphosphoramide, pyridine, N,N-diethylacetamide (DMAC), N,N-diethylformamide, dimethylsulfoxide (DMSO), tetramethylurea (TMU), N,N-dimethylacetamide, N,N-dimethylformamide (DMF), tributylphosphate, trimethylphosphate, N,N,N',N'-tetraethylsulfamide, tetraethylenediamine, tetramethylpropylenediamine, and pentamethyldiethylenetriamine. Preferred donor solvents have a donor number of at least 15, more preferably between about 15 and 40 and most preferably between about 18-40. Particularly preferred donor solvents include N,N-diethylformamide, N,N-dimethylformamide (DMF), dimethylsulfoxide (DMSO), N,N-dimethylacetamide (DMAC); for example, DMF. Suitable acceptor solvents which can be characterized as Lewis acids (they may be protic or aprotic solvents) and promote solvation of anions. Examples include alcohols such as methanol, glycols such as ethylene glycol and polyglycols such as polyethylene glycol as well as nitromethane, trifluoroacetic acide, trifluoromethanesulfonic acid, sulfur dioxide and boron triflouride, and ethylene glycol (EG). Others include nitriles (e.g., acetonitrile (AN), higher nitriles, propionitrile, succinonitrile, butyronitrile, benzonitrile), amides (e.g., formamide, N-methylformamide, N,N-dimethylformamide, N,N-diethylformamide, (DMF), acetamide, N-methylacetamide, N,N-dimethylacetamide (DMAC), N,N-diethylacetamide, N,N,N'N' tetraethylsulfamide, tetramethylurea (TMU), 2-pyrrolidone, N-methylpyrrolidone, N-methylpyrrolidinone), amines (e.g., butylamine, ethylenediamine, triethylamine, pyridine, 1,1,3,3-tetramethylguanidine (TMG), tetraethylenediamine, tetramethylpropylenediamine, pentamethyl diethylenetri amine, organosulfur solvents (e.g., dimethylsulfoxide (DMSO), sulfolane, other sulfones, dimethylsulfite, ethylene sulfite, and organophosphorous solvents (e.g., tributylphosphate, trimethylphosphate, hexamethylphosphoramide (HMPA)).

In the same or separate embodiments a non-aqueous solvent may be added to the aqueous catholyte to effect dissolution of elemental sulfur. The addition of such a solvent (e.g., toluene or carbon disulfide, preferably toluene) can enable charging to elemental sulfur (dissolved or precipitated).

While the use of non-aqueous solvents such as aprotic organic solvents, typically liquids, but not limited as such, may be useful for facilitating the dissolution of high order polysulfide species, protic solvents and ionic liquids may also be incorporated in the aqueous catholyte to further enhance dissolution of lithium sulfide or more generally improve cell performance.

For instance, in particular embodiments the aqueous catholyte comprises water and a protic solvent that is non-aqueous, especially protic organic solvents that are capable of dissolving a significant amount of $Li_2S$. Particularly suitable non-aqueous protic solvents are organic solvents such as alcohols, diols, triols and polyols, especially alcohols (e.g., methanol and ethanol) and diols (e.g., ethylene glycol). Addition of the non-aqueous protic solvent is particularly useful in cells that may be operated at temperatures below the freezing temperature of water and yet still require high solubility for lithium sulfide. Accordingly, in various embodiments the catholyte is formulated with an amount of a non-aqueous protic solvent to achieve a desired freezing point temperature (i.e., melt temperature), including formulations wherein the melt temperature is less than 0° C., less than −5° C., less than −10° C., less than −15° C., less than −20° C., less than −30° C., and less than −40° C. Moreover, it is contemplated herein that the non-aqueous protic solvent may be present in high concentration in the catholyte, including 10%-20%, 20%-30%, 30%-40%, 40%-50%, 50%-60%, 60%-70%, 70%-80%, 80%-90% (e.g., any such volume percentages of methanol, ethanol or ethylene glycol or combinations thereof).

Contact between the aqueous electrolyte and the cathode electron transfer medium, for example an electronically conductive matrix such as a carbon or metal mesh, foam or other high surface area, typically porous, structure, may be enhanced by electrolyte additives and/or co-solvents. Such improved contact enhances utlilization and rate performance of the cell. Electrolyte/catholyte compositions in this regard can include a surfactant, such as a polyol or polyglycol, for example PEG, to wet the catholyte to the conductive matrix. Also or alternatively, the matrix can be surface treated prior to contact with the electrolyte to enhance wetting, for example being soaked in a wetting agent, such as methanol or ethylene glycol, followed by displacement of the wetting agent with the aqueous catholyte solution of polysulfides. Still further in this regard, the catholyte may include dissolved organosulfur as a cathode active material. The organosulfur compound or compounds can self-wet to the cathode electron transfer matrix.

Lithium Anode

Typically, when using a protected lithium electrode as described below in which a solid electrolyte membrane provides isolation of the electroactive material against contact with the aqueous catholyte, the catholyte is devoid of certain extraneous ions which would otherwise interfere with the cell functionality, including contaminating the membrane via diffusion into the conductive atomically formed channels. Accordingly, in various embodiments of the instant invention the aqueous catholyte is substantially devoid of alkali metal cations other than lithium, and more preferably substantially devoid of all metal cations other than lithium. For example the catholyte is devoid of sodium and potassium ions, which is to mean that there is substantially no sodium or potassium ions in the electrolyte.

The cell comprises a Li anode. The lithium electroactive material of the anode is typically in layered form and may be Li metal or a Li metal alloy (e.g., silicon) or Li intercalation material (e.g., lithiated carbon) or in a particular embodiment a silicon carbon composite. In one example, a Li metal foil may be used. In another example lithium ion anodes, which are well known in the battery art, are used as the electroactive lithium material layer (e.g., a carbon intercalation material coated on a copper current collector). Electroactive lithium materials, including intercalation host compounds and lithium alloys and lithium metal are well known in the lithium battery art. In certain embodiments the anode is lithium metal (e.g., in foil or sintered form) and of sufficient thickness (i.e., capacity) to enable the cell to achieve the rated discharge capacity of the cell. The anode may take on any suitable form or construct including a green or sintered compact (such as a wafer or pellet), a sheet, film, or foil, and the anode may be porous or dense. Without limitation, the lithium anode may have a current collector (e.g., copper foil, or suitable expandable metal) pressed or otherwise attached to it in order to enhance the passage of electrons between it and the leads of the cell. Without limitation the cell may be anode or cathode limited. When anode limited, the complete discharge (corresponding to rated capacity) will substantially exhaust all the lithium in the anode. When cathode limited, some active lithium will remain subsequent to the cell delivering its rated capacity.

The anode is protected with a protective membrane architecture chemically stable to both the anode and the environment of the adjacent sulfur cathode. The protective membrane architecture typically comprises a solid electrolyte protective membrane and an interlayer. The solid electrolyte protective membrane is sometimes referred to herein as ion membrane. The protective membrane architecture is in ionic continuity with the Li anode and is configured to selectively transport Li ions while providing an impervious barrier to the environment external to the anode. Protective membrane architectures suitable for use in the present invention are described in applicants' U.S. Pat. Nos. 7,645,543; 7,666,233; 8,048,571; and 7,282,295, incorporated by reference herein in their entirety, and in particular for their description of protective membrane structures and architectures.

FIGS. 5A-D illustrate representative protective membrane architectures from these disclosures suitable for use in the present invention. The protective membrane architectures provide a barrier to isolate a Li anode from ambient and/or the cathode side of the cell while allowing for efficient ion Li metal ion transport into and out of the anode. The architecture may take on several forms. Generally it comprises a solid electrolyte layer that is substantially impervious, ionically conductive and chemically compatible with the external ambient (e.g., air or water) or the cathode environment.

Figure 5A:
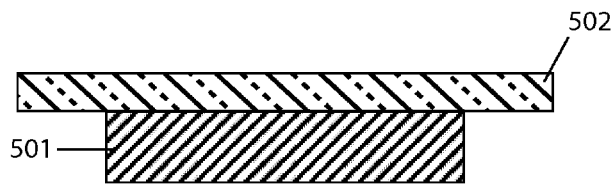
FIGS. 5A-D illustrate various alternative configurations of a protective membrane architecture in accordance with the present invention.

Referring to FIG. 5A, the protective membrane architecture can be a monolithic solid electrolyte 502 that provides ionic transport and is chemically stable to both the active metal anode 501 and the external environment. Examples of such materials are lithium hafnium phosphates (e.g., having a NASICON like structure) such as $Li_{1+x}M_xHf_{2-x}(PO_4)_3$ where M is Cr, In, Fe, Ta, Sc, Lu, Al, or Y (e.g., wherein $0 \leq x \leq 0.5$, and $LiHfPO_4$, LISICON (the lithium-stable analog to NASICON), $Li_5La_3Ta_2O_{12}$ and $Li_5La_3Nb_2O_{12}$, $Na_5MSi_4O_{12}$ (M: rare earth such as Nd, Dy, Gd) and the garnet-like structures described below. These include $Li_{5+x}A_yG_zM_2O_{12}$ (where A is a monovalent, divalent, trivalent, or tetravalent cation; G is a monovalent, divalent, trivalent, or tetravalent cation; where M is a trivalent, tetravalent or pentavalent cation, and $0 \leq x \leq 3$, $0 \leq y \leq 3$, $0 \leq z \leq 3$ and O can be partly or completely replaced by divalent and/or trivalent anions such as $N^{3-}$. Particular examples include $Li_6ALa_2B_2O_{12}$ where B is Nb or Ta or some combination thereof and A may be Ca, Sr, Ba or a combination thereof, especially $Li_6BaLa_2Ta_2O_{12}$; $Li_5La_3M_2O_{12}$ (where M=Nb, Ta or some combination thereof) e.g., $Li_5La_3Ta_2O_{12}$ or $Li_5La_3Nb_2O_{12}$ or $Li_{7+x}A_xG_{3-x}Zr_2O_{12}$ where A is a divalent cation, G is a trivalent cation, $0 \leq x \leq 3$ and O can be partly or completely replaced by divalent and/or trivalent anions such as $N^{3-}$ (e.g., $Li_{7+x}A_xLa_{3-x}Zr_2O_{12}$ such as $Li_7La_3Zr_2O_{12}$ or e.g., wherein A is Zn such as $Li_{7+x}Zn_xLa_{3-x}Zr_2O_{12}$ and the like such as and $Li_{7+x}A_xLa_{3-x}Zr_2O_{12}$ (e.g., where A is Zn or $Li_7La_3Zr_2O_{12}$). These materials and methods for making them are described in U.S. Pat. No. 7,901,658 to Weppner and Thangadurai and US Patent Publication No. 2010/0203383 to Weppner, and are hereby incorporated by reference, in particular for their disclosure relating to the composition and making of these materials. As well as $Li_{5+x}La_3(Zr_x, A_{2-x})O_{12}$ wherein A is at least one selected from the group consisting of Sc, Ti, V, Nb, Hf, Ta, Al, Si, Ga, Ge, and Sn, such as $Li_{5+x}La_3(Zr_x, Nb_{2-x})O_{12}$ where x=0-2, and including elements substituted for Zr such as Sc, Ti, V, Y, Hf, Ta and Nb or the like (e.g., $Li_{6.75}La_3Zr_{1.75}Nb_{0.25}O_{12}$, such garnet-like lithium ion conductors are described in US Patent Pub. No. 2011/0244337 to Ohta et al which is hereby incorporated by reference.

More commonly, the ion membrane architecture is a composite composed of at least two components of different materials having different chemical compatibility requirements, one chemically compatible with the anode, the other chemically compatible with the exterior; generally ambient air or water, and/or battery electrolytes/catholytes. By "chemical compatibility" (or "chemically compatible") it is meant that the referenced material does not react to form a product that is deleterious to battery cell operation when contacted with one or more other referenced battery cell components or manufacturing, handling, storage or external environmental conditions. The properties of different ionic conductors are combined in a composite material that has the desired properties of high overall ionic conductivity and chemical stability towards the anode, the cathode and ambient conditions encountered in battery manufacturing. The composite is capable of protecting an active metal anode from deleterious reaction with other battery components or ambient conditions while providing a high level of ionic conductivity to facilitate manufacture and/or enhance performance of a battery cell in which the composite is incorporated.

Figure 5B:
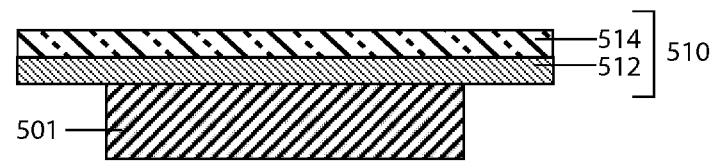
Figure 5C:
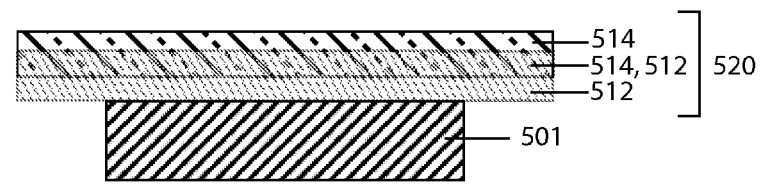

Referring to FIG. 5B, the protective membrane architecture can be a composite solid electrolyte 510 composed of discrete layers, whereby the first material layer 512 (also sometimes referred to herein as "interlayer") is stable to the active metal anode 501 and the second material layer 514 is stable to the external environment. Alternatively, referring to FIG. 5C, the protective membrane architecture can be a composite solid electrolyte 520 composed of the same materials, but with a graded transition between the materials rather than discrete layers.

Generally, the solid state composite protective membrane architectures (described with reference to FIGS. 5B and C have a first and second material layer. The first material layer (or first layer material) of the composite is ionically conductive, and chemically compatible with an active metal electrode material. Chemical compatibility in this aspect of the invention refers both to a material that is chemically stable and therefore substantially unreactive when contacted with an active metal electrode material. It may also refer to a material that is chemically stable with air, to facilitate storage and handling, and reactive when contacted with an active metal electrode material to produce a product in-situ that is chemically stable against the active metal electrode material and has the desirable ionic conductivity (i.e., a first layer material). Such a reactive material is sometimes referred to as a "precursor" material. The second material layer of the composite is substantially impervious, ionically conductive and chemically compatible with the first material. Additional layers are possible to achieve these aims, or otherwise enhance electrode stability or performance. All layers of the composite have high ionic conductivity, at least $10^{-7}$ S/cm, generally at least $10^{-6}$ S/cm, for example at least $10^{-5}$ S/cm to $10^{-4}$ S/cm, and as high as $10^{-3}$ S/cm or higher so that the overall ionic conductivity of the multi-layer protective structure is at least $10^{-7}$ S/cm and as high as $10^{-3}$ S/cm or higher.

Figure 5D:
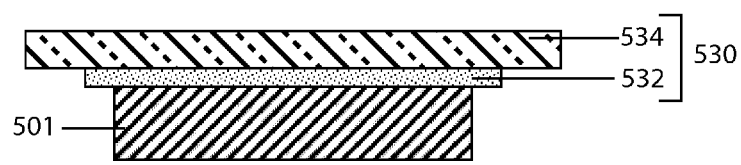

A fourth suitable protective membrane architecture is illustrated in FIG. 5D. This architecture is a composite 530 composed of an interlayer 532 between the solid electrolyte 534 and the active metal anode 501 whereby the interlayer is includes a non-aqueous liquid, gel or solid polymer electrolyte polymer phase anolyte. Thus, the architecture includes an active metal ion conducting separator layer with a non-aqueous anolyte (i.e., electrolyte in contact with the anode electroactive material), the separator layer being chemically compatible with the active metal and in contact with the anode; and a solid electrolyte layer that is substantially impervious (pinhole- and crack-free) ionically conductive layer chemically compatible with the separator layer and aqueous environments and in contact with the separator layer. The solid electrolyte layer of this architecture (FIG. 5D) generally shares the properties of the second material layer for the composite solid state architectures (FIGS. 5B and C). Accordingly, the solid electrolyte layer of all three of these architectures will be referred to below as a second material layer or second layer.

A wide variety of materials may be used in fabricating protective composites in accordance with the present invention, consistent with the principles described above. For example, in the solid state embodiments of FIGS. 5B and 5C, the first layer (material component), in contact with the active metal, may be composed, in whole or in part, of active metal nitrides, active metal phosphides, active metal halides active metal sulfides, active metal phosphorous sulfides, or active metal phosphorus oxynitride-based glass, as well as lithium hafnium phosphates and the garnet like structures described above in reference to the monolithic membrane architecture (e.g., $Li_{7+x}A_xLa_{3-x}Zr_2O_{12}$ and $Li_{5+x}A_yG_zM_2O_{12}$ such as $Li_6BaLa_2Ta_2O_{12}$ and the others as described herein above. Specific examples include $Li_3N$, $Li_3P$, LiI, LiBr, LiCl, LiF, $Li_2S$—$P_2S_5$, $Li_2S$—$P_2S_5$—LiI and LiPON. Active metal electrode materials (e.g., lithium) may be applied to these materials, or they may be formed as reaction products in situ by contacting precursors such as metal nitrides, metal phosphides, metal halides, red phosphorus, iodine, nitrogen or phosphorus containing organics and polymers, and the like with lithium. A particularly suitable precursor material is copper nitride (e.g., $Cu_3N$). The in situ formation of the first layer may result from an incomplete conversion of the precursors to their lithiated analog. Nevertheless, such composite reaction products formed by incomplete conversions meet the requirements of a first layer material for a protective composite in accordance with the present invention and are therefore within the scope of the invention.

For the anolyte interlayer composite protective architecture embodiment (FIG. 5D), the protective membrane architecture has an active metal ion conducting separator layer chemically compatible with the active metal of the anode and in contact with the anode, the separator layer comprising a non-aqueous anolyte, and a substantially impervious, ionically conductive layer ("second" layer) in contact with the separator layer, and chemically compatible with the separator layer and with the exterior of the anode. The separator layer can be composed of a semi-permeable membrane impregnated with an organic anolyte. For example, the semi-permeable membrane may be a micro-porous polymer, such as are available from Celgard, Inc. The organic anolyte may be in the liquid or gel phase. For example, the anolyte may include a solvent selected from the group consisting of organic carbonates, ethers, lactones, sulfones, etc, and combinations thereof, such as EC, PC, DEC, DMC, EMC, 1,2-DME or higher glymes, THF, 2MeTHF, sulfolane, and combinations thereof. 1,3-dioxolane may also be used as an anolyte solvent, particularly but not necessarily when used to enhance the safety of a cell incorporating the structure. When the anolyte is in the gel phase, gelling agents such as polyvinylidine fluoride (PVdF) compounds, hexafluoropropylene-vinylidene fluoride copolymers (PVdf-HFP), polyacrylonitrile compounds, cross-linked polyether compounds, polyalkylene oxide compounds, polyethylene oxide compounds, and combinations and the like may be added to gel the solvents. Suitable anolytes will, of course, also include active metal salts, such as, in the case of lithium, for example, $LiPF_6$, $LiBF_4$, $LiAsF_6$, $LiSO_3CF_3$ or $LiN(SO_2C_2F_5)_2$. One example of a suitable separator layer is 1 M $LiPF_6$ dissolved in propylene carbonate and impregnated in a Celgard microporous polymer membrane.

The second layer (material component) of the protective composite may be composed of a material that is substantially impervious, ionically conductive and chemically compatible with the first material or precursor, including glassy or amorphous metal ion conductors, such as a phosphorus-based glass, oxide-based glass, phosphorus-oxynitride-based glass, sulfur-based glass, oxide/sulfide based glass, selenide based glass, gallium based glass, germanium-based glass, Nasiglass; ceramic active metal ion conductors, such as lithium beta-alumina, sodium beta-alumina, Li superionic conductor (LISICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, $Li_{1+x}Ti_{2-x}Al_x(PO_4)_3$ ($0.1 \leq x \leq 0.9$) and crystallographically related structures, $Li_{1+x}Hf_{2-x}Al_x(PO_4)_3$ ($0.1 \leq x \leq 0.9$), $Li_3Zr_2Si_2PO_{12}$, $Na_5ZrP_3O_{12}$, Li-Silicates, $Li_{0.3}La_{0.5}TiO_3$, $Li_5MSi_4O_{12}$ (M: rare earth such as Nd, Gd, Dy) $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes.

A particularly suitable glass-ceramic material for the second layer of the protective composite is a lithium ion conductive glass-ceramic having the following composition:

| Composition | mol % |
| --- | --- |
| $P_2O_5$ | 26-55% |
| $SiO_2$ | 0-15% |
| $GeO_2 + TiO_2$ | 25-50% |
| in which $GeO_2$ | 0-50% |
| $TiO_2$ | 0-50% |
| $ZrO_2$ | 0-10% |
| $M_2O_3$ | 0-10% |
| $Al_2O_3$ | 0-15% |
| $Ga_2O_3$ | 0-15% |
| $Li_2O$ | 3-25% | and containing a predominant crystalline phase composed of $Li_{1+x}$(M, Al, Ga), $(Ge_{1-y}Ti_y)_{2-x}(PO_4)_3$ where $X \leq 0.8$ and $0 \leq Y \leq 1.0$, and where M is an element selected from the group consisting of Nd, Sm, Eu, Gd, Tb, Dy, Ho, Er, Tm and Yb and/or $Li_{1+x+y}Q_xTi_{2-x}Si_yP_{3-y}O_{12}$ where $0 < X \leq 0.4$ and $0 < Y \leq 0.6$, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference.

Another particularly suitable material for the second layer of the protective composite is a lithium ion conducting oxide having a garnet like structure. These include those described above with reference to the monolithic membrane architecture, and include $Li_6BaLa_2Ta_2O_{12}$; $Li_7BaLa_3Ta_2O_{12}$, $Li_5La_3M_2O_{12}$, $Li_5BaLa_3Ta_2O_{12}$ (M=Nb, Ta)$Li_{7+x}A_xLa_{3-x}Zr_2O_{12}$ where A may be Zn. These materials and methods for making them are described in U.S. Patent Application Pub. No. 2007/0148533 (application Ser. No. 10/591,714), hereby incorporated by reference in its entirety, and suitable garnet like structures are also described in International Patent Application Pub. No.: WO/2009/003695 which is hereby incorporated by reference for all that it contains, and in particular for its description of garnet-like structures.

The composite should have an inherently high ionic conductivity. In general, the ionic conductivity of the composite is at least $10^{-7}$ S/cm, generally at least about $10^{-6}$ to $10^{-5}$ S/cm, and may be as high as $10^{-4}$ to $10^{-3}$ S/cm or higher. The thickness of the first precursor material layer should be enough to prevent contact between the second material layer and adjacent materials or layers, in particular, the active metal of the anode. For example, the first material layer for the solid state membranes can have a thickness of about 0.1 to 5 microns; 0.2 to 1 micron; or about 0.25 micron. Suitable thickness for the anolyte interlayer of the fourth embodiment range from 5 microns to 50 microns, for example a typical thickness of Celgard is 25 microns.

The thickness of the second material layer is preferably about 0.1 to 1000 microns, or, where the ionic conductivity of the second material layer is about $10^{-7}$ S/cm, about 0.25 to 1 micron, or, where the ionic conductivity of the second material layer is between about $10^{-4}$ about $10^{-3}$ S/cm, about 10 to 1000 microns, preferably between 1 and 500 microns, and more preferably between 10 and 100 microns, for example about 20 microns.

Seals and methods of making seals which are particularly suitable for sealing protected anodes described hereinabove and elsewhere, including compliant and rigid seals, are fully described in US Patent Publication No. 2007/0037058 and US Patent Publication No.: US 2007/0051620 to Visco et al., and are hereby incorporated by reference in their entirety, and in particular for their descriptions of cell seals and sealing techniques.

Optional Separator

With reference to FIG. 1 an optional separator component 130 may be interposed between the membrane architecture and the sulfur cathode. Various separator materials suitable for use herein are known in the battery arts. These separators include porous inorganic mats, microporous polymer sheets, and gels. In a particular embodiment the separator is a hydrogel comprising water impregnated a polymer. In some embodiments the polymer itself may also serve as a solid solvent for the dissolution of active sulfur species, such as PEO and polyalcohols (e.g., polyvinyl alcohol).

In various embodiments the instant battery cell is fabricated such that the entirety of the cathode capacity is loaded into the cell upon fabrication as dissolved polysulfide species (e.g., the active stoichiometric ratio of $Li_2Sx$ with x is >1 e.g., about $Li_2S_2$, about $Li_2S_3$, about $Li_2S_4$, and about $Li_2S_5$). In certain embodiments solid phase sulfur is added to further enhance cell capacity (i.e., the cathode active species derived from a combination of dissolved polysulfide species and solid elemental sulfur. In some embodiments the entirety of the cathode active sulfur is loaded into the cathode as solid elemental sulfur. While in other embodiments, as described herein, the catholyte is in a fully reduced state composed of $Li_2S$ dissolved in water, and in some embodiments thereof solid phase $Li_2S$ may be dispersed in the catholyte or present as a solid particle in the pores of the cathode or separator.

In accordance with various embodiments of the instant invention a significant amount of the cathode ampere-hour capacity is derived from the active aqueous sulfur catholyte, and that amount is typically greater than 10%; for instance, greater than 20%, greater than 30%, greater than 40%, greater than 50%, greater than 60%, greater than 70%, greater than 80%, greater than 90%, and in certain embodiments 100%.

Aqueous Lithium Sulfur Cells Assembled in the Discharged State

The fast kinetics of dissolution and high solubility of lithium sulfide in water allows for a practical lithium sulfur cell that makes use of alternative anodes (e.g., anodes other than lithium metal) which are entirely devoid or mostly devoid of active lithium when incorporated in the cell during assembly, and remain in that state until the cell is initially operated via an electrochemical charge. By this expedient, aqueous lithium sulfur cells assembled in the discharged state and having anodes of exceptional reversibility are enabled herein for providing battery cells of long cycle life, low cost, and/or improved air stability for manufacturing. In accordance with such embodiments and continuing with reference to FIG. 1, in various embodiments thereof the instant cell includes a protected lithium anode, similar in structure to that described above, having a lithium electroactive layer devoid of active lithium prior to initial cell operation (i.e., the cell assembled having an anode with an electroactive layer devoid of active lithium). Suitable such electroactive layers include those coated on a current collector as are known in the lithium ion battery field. The anode layers composed of anode electroactive materials including those commonly referred to as intercalation materials, insertion materials, alloying materials, intermetallic materials and the like, which in the fully discharged state (i.e., fully or mostly in a reduced oxidation state), and when incorporated into the cell during manufacture are entirely devoid, or mostly devoid, of active lithium. Particularly suitable such materials include carbons capable of electrochemically intercalating lithium, metal compound intercalation materials, such as metal oxide compounds including transition metal oxides such as molybdenum oxide, tungsten oxide, titanium oxides, (e.g., indium tin oxide), lithium titanium oxides of compositions $Li_xTiO_2$, $Li_4Ti_5O_{12}$, preferably with a potential within about 1V of the lithium potential, materials capable of alloying with lithium electrochemically wherein the material is electro-reduced such as metals and semi-metals (e.g., aluminum, silver, indium, tin, bismuth, lean, silicon, germanium, antimony and combinations thereof binary and ternary metal and/or semi-metal alloys and the like) metal alloys (e.g., antimony alloys including $Cu_2Sb$, CoSb, MnSb, InSb) and semi-metals (e.g., silicon), semi-metal alloys, and such metal alloy intermetallics and combinations thereof including composites such as composites including alloys (e.g., composite silicon alloys) such as carbon intercalation metal or semi-metal material composites (e.g., C—Si, C—Sn, Sn-M-C, Sb-M-C, Si-M-C, where M is a metal such as Ti, V, Cr, Mn, Fe and Co, especially Sn—Co—C and Sb—Cu—C, such as $Cu_2Sb$—C, and Si—Co—C), and others such as alloying metal or semi-metal alloys combined with C and/or $SiO_x$ to form such composites alloys.

In accordance with this aspect of the invention, the cell is constructed in the discharged state, and typically in the fully discharged state using for instance an aqueous catholyte having dissolved therein $Li_2S$. In preferred embodiments, to enhance the net capacity of the cell, solid phase $Li_2S$ may be incorporated on the cathode side of the cell out of contact with the anode electroactive material but in contact with the catholyte, and typically at least a portion of the $Li_2S$ in contact with the cathode; however, the invention is not meant to be limited as such and it is contemplated herein that the $Li_2S$ may be loaded in a separator component disposed between the anode protective membrane architecture and the cathode, or disposed in a region of the cell removed from the electron transfer medium, the Li2S in a remote region nearby the cathode but not necessarily in contact with the electron transfer medium (e.g., not in contact with the electron transfer medium). In operation the instant cell is caused by a user or the cell manufacturer to undergo an initial charging step. During charge lithium intercalates into the anode (e.g., into the electroactive carbon) and active sulfur is electro-oxidized at the electron transfer medium.

In yet another embodiment rather than load the protected anode with an electroactive layer, lithium metal is plated onto a current collector disposed adjacent to the protective membrane architecture (e.g., a copper foil current collector). By this expedient, the entirety of the metal lithium is derived from the reduced lithium polysulfide species in the electrolyte and electro-reduced to form the lithium within the anode. By this expedient, the cell is assembled in a state wherein the protected anode is not only devoid of active lithium it is entirely devoid of an electroactive material prior to the initial charging operation. This embodiment is particularly advantageous as it provides a highly cost effective technique for effectively fabricating an aqueous lithium metal sulfur battery without having to supply lithium metal in foil or coated form on a current collector substrate because the entirety of the lithium metal is generated as a result of electrochemically charging the cell. In some embodiments it is preferable to have a thin wetting layer on the surface of the current collector (e.g., an aluminum layer) or a thin layer of lithium pre-deposited on the current collector (e.g., less than 20 micron layer) prior to cell assembly, the thin layer of lithium serving to provide a surface for facile electrochemical lithium deposition.

Flow Cell and Flow Cell System

Figure 6:
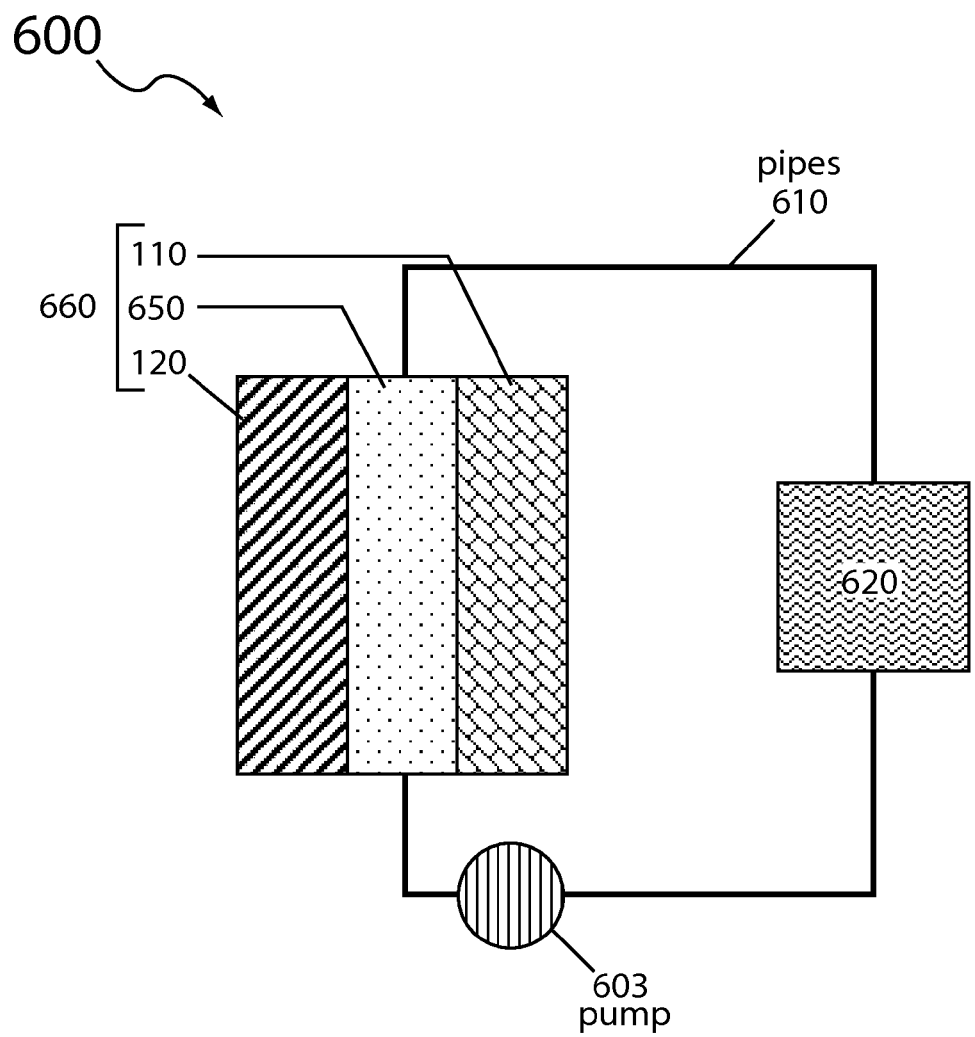
FIG. 6 is a schematic cross section of a battery flow cell system in accordance with an embodiment of the present invention.

With reference to FIG. 6 there is illustrated a representative embodiment of an aqueous lithium sulfur flow cell battery system 600 in accordance with the instant invention. The system includes a reactor cell 660 in which there is positioned a lithium anode 120 and a sulfur cathode 110 configured, in one embodiment, in a spatially apart relationship, therewith defining an inter-electrode region 650 through which an aqueous sulfur catholyte is caused to flow during operation. In various embodiments the lithium anode is a protected lithium electrode as described above and the sulfur cathode likewise as described above. In a slightly modified embodiment the sulfur cathode, a porous three dimensional body, is positioned in direct contact with the first surface of the protected anode solid electrolyte membrane architecture (i.e., not in a spatially apart relationship) and the aqueous catholyte is caused to flow into the pores of the cathode structure.

Continuing with reference to FIG. 6 the system further comprises an external reservoir system, which may take the form of a storage tank 620 for storing the aqueous sulfur catholyte to be flowed through the inter-electrode region or channel. The reservoir system may also include pipeworks 610 for fluidly coupling the tank to the reactor, and a pump 603 for circulating the electrolyte through the channel. The pipeworks may have valves (not shown) for closing or opening the reactor cell to the storage tank. The pump may be operated for circulating the electrolyte through the channel, and the valves may be used to control the flow of catholyte through the reactor.

The aqueous catholyte provides the electroactive sulfur species, which are electrochemically reacted at the sulfur electrode during charge and discharge. In operation, the aqueous catholyte from the storage tank is caused to flow by and/or through the sulfur cathode, and dissolved polysulfide species are electro-reduced when the system is delivering electricity (during discharge) and electro-oxidized when storing electricity on charge.

Since the ampere-hour capacity of the cathode is provided by the aqueous catholyte in the storage tank, the sulfur cathode is typically assembled in the reactor cell devoid of elemental sulfur. For instance, the sulfur cathode may be a carbon matrix optionally coated with a catalyst to facilitate polysulfide redox while inhibiting hydrogen evolution. Moreover, during system assembly, while the lithium electroactive material of the anode may be incorporated in a fully charged state (e.g., in the form of a lithium metal foil), in preferred embodiments it is an intercalation material or alloy material that is incorporated in the fully discharged state (i.e., devoid of any active lithium). Carbon materials such as graphitic or synthetic carbons capable of reversibly intercalating lithium are a particularly suitable lithium electroactive material for use in the instant flow cell system. Others include lithium alloying materials, as described above, such as silicon and tin which are capable of reversibly absorbing/desorbing lithium electrochemically, as well as composite carbon silicon materials.

Held in the storage tank, the aqueous catholyte effectively provides the cathode fuel for the electrochemical reaction at the sulfur cathode, and the aqueous catholyte embodiments described above with reference to the battery cell embodiment illustrated in FIG. 1 are suitable for use herein as a cathode fuel. The aqueous catholyte fuel comprises polysulfide species dissolved in water. In embodiments the concentration of the dissolved polysulfide species in the aqueous electrolyte is in the range of 0.5 to 1 molar sulfur, 1 to 2 molar sulfur, 2 to 3 molar sulfur, 3 to 4 molar sulfur, 4 to 5 molar sulfur, 5 to 6 molar sulfur, 6 to 7 molar sulfur, 7 to 8 molar sulfur, 8 to 9 molar sulfur, 9 to 10 molar sulfur, and in some embodiments the concentration of polysulfide species is greater than 10 molar sulfur, greater than 11 molar, greater than 12 molar, greater than 13 molar, greater than 14 molar, greater than 15 molar, and greater than 16 molar. In other embodiments a catholyte of like sulfur concentration as that of the ranges listed immediately above is based on one or more alcohol solvents or comprises an alcohol solvent as an additional component of the aqueous catholyte. Particularly suitable such alcohols include those described above and especially methanol, ethanol, and glycols (list others here).

In one embodiment the system is assembled with the lithium electroactive material in the discharged state (e.g., carbon intercalation material devoid of intercalated lithium), and the aqueous catholyte comprising highly reduced polysulfide species, e.g., dissolved $Li_2S$. For example, the aqueous catholyte can be a solution of about 3 molar $Li_2S$ dissolved in water, and is typically greater than 1 molar $Li_2S$. Aqueous sulfur catholyte storage tanks having enhanced sulfur capacity (i.e., greater sulfur capacity per unit volume) may be achieved by adding additional solid lithium sulfide to the catholyte beyond its solubility limit (i.e., a saturated water solution of $Li_2S$). Because of the fast kinetics of lithium sulfide dissolution in water, additional catholyte capacity may be added to the tank by dispersing or suspending solid phase lithium sulfide in the aqueous catholyte.

Continuing with reference to the above embodiment, the system is assembled in the fully discharged state so it must undergo an initial charge reaction to lithiate the carbon intercalation material. The initial charge may be conducted via electro-oxidation of the reduced aqueous catholyte (e.g., 3 molar $Li_2S$ water solution) or a conditioning catholyte formulation comprising lithium may be used, for instance one in which sulfur is not the electroactive species. For example, the initial charge may be completed by using a water based lithium nitrate catholyte solution that is circulated or caused to flow past the cathode, whereupon the water is electro-oxidized and oxygen evolved, while at the anode lithium ions from the conditioning catholyte electro-reductively intercalate into the carbon. The conditioning catholyte flowing through the channel may be electro-oxidized until the reaction is complete and the carbon is sufficiently or fully lithiated. Thereafter, the conditioning catholyte tank is replaced by a tank of aqueous sulfur catholyte.

In embodiments wherein the lithium electroactive material is fully or mostly charged via the lithiation step described above (e.g., by using a conditioning catholyte), the aqueous catholyte may then be formulated in an oxidative or highly oxidative state; for instance, as elemental sulfur dispersed or suspended in a water solution typically also comprising a dissolved lithium salt (e.g., lithium hydroxide) to support the ionic current. It is contemplated that solvents capable of dissolving elemental sulfur such as toluene may be added to the catholyte in order to dissolve some of the dispersed solid sulfur and by this expedient facilitate electro-reduction at the sulfur cathode.

Various compositions of the as formulated catholyte storage tanks are contemplated. In various embodiments the flow cell is operated such that the active stoichiometric lithium sulfur ratio is $Li_2S_x$ with (1<x<5), (x=5), or (x>5), with a sulfur concentration in the range of 1 to 16 molar.

In the aforementioned flow cell embodiments, the lithium electroactive material is stationary, which is to mean that it is non-flowing and incorporated as a component of the protected lithium electrode, e.g., typically in the form of a layer such as a sintered layer or a coating on a current collector as is well known in the field of lithium ion batteries. Thus, the capacity of the anode is set once the coating is formed and the system is assembled.

Figure 7:
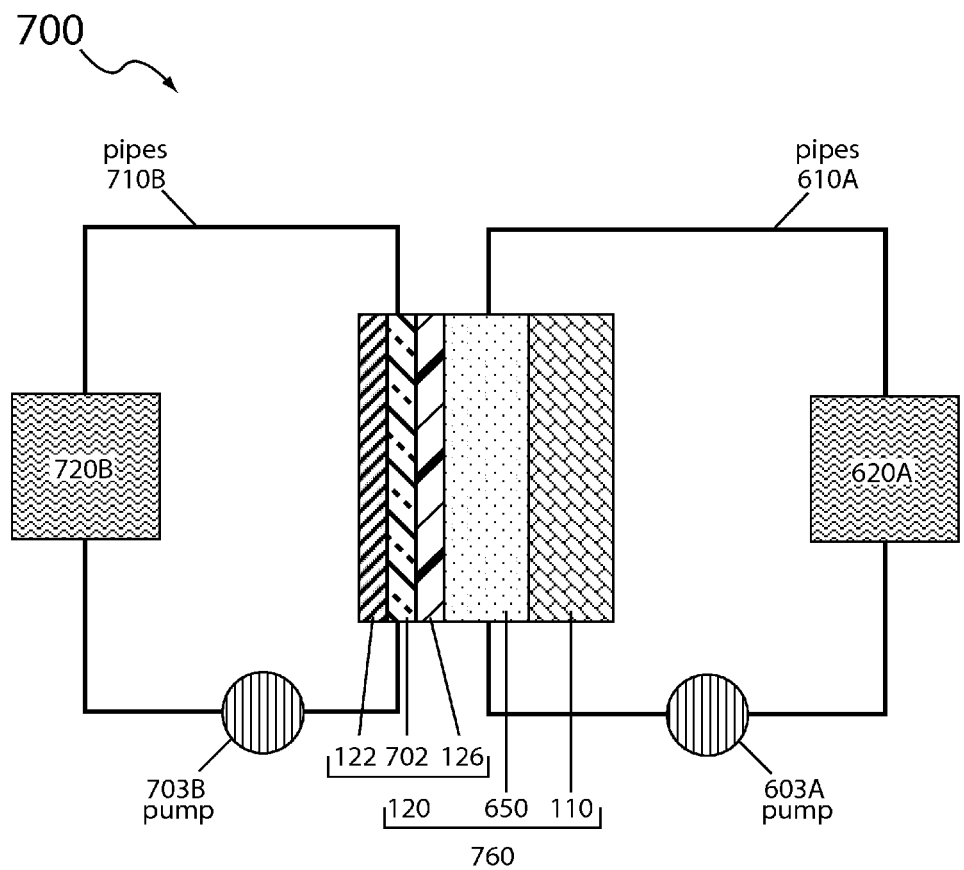
FIG. 7 is a schematic cross section of a battery flow cell system in accordance with an alternative embodiment of the present invention.

In an alternative embodiment, with reference to the flow cell system 700 illustrated in FIG. 7, the structure of FIG. 6 is supplemented by a reactor cell 760 configured for through flow of a flowable lithium electroactive material (e.g., an electroactive lithium slurry) between an anode current collector 122 on which the electrochemical reactions take place and the second surface of a substantially impervious lithium ion conducting membrane architecture 126. Flowable lithium electroactive materials suitable for use herein are described in US Patent Application Pub. Nos.: 2011/0200848 of Chiang et al., published Aug. 18, 2011 and 2010/0323264 of Chiang et al., published Dec. 23, 2011, and each of these is hereby incorporated by reference for all that they contain in this regard. Generally these are anode particles dispersed in an ionically conductive carrier fluid that is compatible with the anode particles over the range of oxidation state encompassing full charge to full discharge. Particularly suitable anode particulates are intercalation carbons or alloy materials such as silicon, or a combination of these (e.g., carbon-silicon composite). The anode current collector 122 is disposed in the cell in spaced relation to the protective membrane architecture, thus defining a channel 702 through which the lithium electroactive slurry is caused to flow, for instance via pumping action. The flow system includes a second external reservoir system for the lithium anode, which may take the form of a storage tank 720B for storing the lithium anode slurry and pipeworks 710B for fluidly coupling the tank to the reactor cell, and a pump 703B for circulating the slurry through the channel, similar to that which is described above for circulating the sulfur catholyte.

EXAMPLES

Aqueous Catholytes with Dissolved Active Sulfur Species

The following examples provide details illustrating the preparation and advantageous properties, including high ionic conductivity, of aqueous catholytes with dissolved active sulfur species suitable for use in electrochemical cells in accordance with the present invention. These examples are provided to exemplify and more clearly illustrate aspects of the present invention and are in no way intended to be limiting.

Example 1

This example pertains to the preparation and conductivity measurement of a first active aqueous sulfur catholyte (i.e., Catholyte #1) having water as a solvent, an active stoichiometric ratio of $Li_2S_4$, and a sulfur concentration of 10 moles/liter (molar) sulfur. The precursor chemicals $Li_2S$ and elemental sulfur are used in proper proportion to yield an active stoichiometric ratio of $Li_2S_4$. In addition to the precursor chemicals, Catholyte #1 also contains, dissolved therein, an additional basic lithium salt, specifically 0.5 molar LiOH.

The catholyte was prepared in a 25 mL volumetric flask inside a main glove box filled with argon gas (i.e., an inert gas), the glove box having oxygen concentration of less than 5 ppm (i.e., the environment in which the catholyte is made is substantially devoid of molecular oxygen). The required amount of lithium hydroxide (reagent grade, Sigma Aldrich) was weighed in a different glove box (second glove box) filled with dry argon having less than 2 ppm of moisture and then was transferred to the main glove box used for catholyte preparation. Deionized water was boiled and transferred to the main glove box in a closed container. Inside the main glove box, argon gas was bubbled through the container in order to remove remaining traces of oxygen. The required amount of $Li_2S$ (Sigma Aldrich, 99% purity) was determined from the reaction $8\ Li_2S + 3\ S_8 \rightarrow 8\ Li_2S_4$ and mixed with the lithium hydroxide, and placed in a flask. Next, 10 mL of the deionized and deoxygenated water was added to the flask, and the mixture was stirred for 30 minutes. Based on the aforementioned stoichiometric reaction and $Li_2S_4$ as the desired active stoichiometric ratio, the required amount of sulfur (Sigma Aldrich, reagent grade, purified by sublimation) was added to the mixture. Then, deionized water was added to the mixture up to the 25 mL mark, the flask was tightly sealed (to avoid active sulfur loss in the form of $H_2S$ gas), and the mixture was stirred overnight. Next day, the stir bar was removed, water was added up to the 25 mL mark, and the solution was stirred for another hour. The obtained solution was reddish orange and did not contain any visible solids. Conductivity of the prepared catholyte was measured using a conductometric cell (Radiometer Analytical S.A., France) with two platinized platinum electrodes. The obtained specific conductivity value is high (i.e., greater than $10^{-2}$ S/cm) and specifically the measured value was 0.1 S/cm.

Example 2

This example pertains to the preparation and conductivity measurement of a second active aqueous sulfur catholyte (i.e., Catholyte #2) having water as a solvent, an active stoichiometric ratio of $Li_2S_4$, and a sulfur concentration of 12 moles/liter (molar) sulfur. Similar to the procedure described in Example #1, the precursor chemicals $Li_2S$ and elemental sulfur were used to effect the active $Li_2S_4$ active stoichiometric ratio. The catholyte was devoid of salts (e.g., additional lithium salts) other than those used to generate the active stoichiometric ratio of $Li_2S_4$. In particular, the catholyte was devoid of supporting lithium salts or basic lithium salts.

The catholyte was prepared in a manner similar to that for Catholyte #1, as described above in Example 1. Required amounts of the precursor chemicals (sulfur and $Li_2S$) were mixed together, placed in a 25 mL volumetric flask, and covered with deionized and deoxygenated water up to the 25 mL mark. Notably the water is deoxygenated prior to contacting the precursor chemicals. The flask was tightly sealed and the contents were stirred. The mixture quickly turned reddish orange and its temperature rose significantly. Dissolution (via, in part, hydrolysis) occurred quickly, and much faster than during preparation of Catholyte #1 since the presence of LiOH slows down the rate of $Li_2S$ hydrolysis. After stirring the mixture overnight, a clear reddish orange liquid was obtained. Thereafter the stir bar was removed, water was added up to the 25 mL mark, and the solution was stirred for another hour. The conductivity of the prepared catholyte was measured in a manner similar to that described in Example 1, and a specific conductivity value of $8\times10^{-2}$ S/cm was obtained.

Example 3

This example pertains to the preparation of a third active aqueous sulfur catholyte (i.e., Catholyte #3) having water as a solvent, an active stoichiometric ratio of $Li_2S_4$, and a sulfur concentration of 17 moles/liter (molar) sulfur. Similar to that described in Example #1, the precursor chemicals $Li_2S$ and elemental sulfur are used to effect the active $Li_2S_4$ active stoichiometric ratio. The catholyte is devoid of salts (e.g., additional lithium salts) other than those used to generate the active stoichiometric ratio of $Li_2S_4$. In particular, the catholyte is devoid of supporting lithium salts or basic lithium salts.

In order to prepare a catholyte with the highest possible active sulfur content (in the form of $Li_2S_4$), enough sulfur and $Li_2S$ were mixed to prepare 20M sulfur having an active stoichiometric ratio of $Li_2S_4$. Then the same procedure as used in Example 2 was followed. After stirring overnight, the solution was not clear and contained undissolved solids. The solution was filtered through a glass microfiber GF/A filter and the clear filtrate (i.e., clear catholyte solution) was analyzed for total dissolved sulfur content using a method that was described in the article by G. Schwarzenbach, A. Fischer in Heir. Chim. Acta 43, 1365-1390 (1960), and entitled Die Acidität der sulfane and die zusammensetzung wässeriger polysulfdlosungen. The article, and specifically the method for determining sulfur concentration, is hereby incorporated by reference. In particular, the dissolved sulfur-containing species were oxidized to sulfate, which was then titrated by barium perchlorate in the presence of Thorin indicator. The determined sulfur concentration in the catholyte (i.e., sulfur molarity) was 17.25M sulfur (i.e., greater than 17 molar sulfur).

Example 4

This example pertains to the preparation and conductivity measurement of a fourth active aqueous sulfur catholyte (i.e., Catholyte #4) having water as a solvent, an active stoichiometric ratio of $Li_2S$, and a sulfur concentration of 3 moles/liter sulfur (3 molar sulfur). In this example, the precursor chemical was solely $Li_2S$, and the catholyte was devoid of additional salts (e.g., additional lithium salts). In particular, the catholyte was devoid of supporting lithium salts or basic lithium salts.

The required amount of $Li_2S$ was placed in a volumetric flask and deionized and deoxygenated water (as described above) was added to the 25 mL mark. The mixture quickly turned reddish orange and its temperature rose significantly. The mixture was stirred overnight, then the stir bar was removed, water was added up to the 25 mL mark, and the solution was stirred for another hour. The resulting liquid was clear and had a reddish orange color. This experiment indicates that the solubility of $Li_2S$ in water is quite high.

The conductivity of the prepared catholyte containing products of $Li_2S$ hydrolysis was measured in a manner similar to that used in Example 1, and an exceptionally high value of $2\times10^{-1}$ S/cm was obtained (i.e., greater than $10^{-1}$ S/cm).

By this expedient, and as described herein below in Example #11, water dissolved $Li_2S$ may be used as a source of active Li for insertion (e.g., intercalation), for instance, for the purpose of charging alternative anodes such as carbon-based intercalation materials and other materials that are devoid of active lithium upon cell fabrication, including those instances in which the cell is assembled in a discharged state (e.g., a fully discharged state). Moreover, the high solubility and fast dissolution kinetics of $Li_2S$ in water eliminates or significantly reduces problems associated with precipitation of $Li_2S$ discharge product on the cathode surface (or inside the cathode pore space) where it can adversely effect cell performance, especially cycle life.

Example 5

This example pertains to the preparation and conductivity measurement of a protic non-aqueous active sulfur catholyte (i.e., Catholyte #5) having alcohol as a solvent (specifically methanol), an active stoichiometric ratio of $Li_2S_4$, and a sulfur concentration of 6 moles/liter (molar) sulfur. Similar to the procedure described in Example #1, the precursor chemicals $Li_2S$ and elemental sulfur were used to effect the active $Li_2S_4$ active stoichiometric ratio. The catholyte was devoid of salts (e.g., additional lithium salts) other than those used to generate the active stoichiometric ratio of $Li_2S_4$. In particular, the catholyte was devoid of supporting lithium salts or basic lithium salts.

The required amount of sulfur and $Li_2S$ precursor chemicals were placed in a 25 mL volumetric flask, and the rest of the operations were similar to those described in Example #2, except that methanol was used instead of water. The resulting protic non-aqueous catholyte was clear and had a reddish orange color. Its conductivity was measured to be $1.1\times10^{-2}$ S/cm.

Electrochemical Testing of Li/S Cells

The following examples provide details illustrating electrochemical testing of Li/S cells in accordance with the present invention. These examples are provided to exemplify and more clearly illustrate aspects of the present invention and are in no way intended to be limiting.

Preparation of Cathode Materials

Carbon based electron transfer mediums were used as the cathode (i.e., carbon based cathodes). Specifically, a porous carbon paper matrix (Lydall Technical Papers, Rochester, N.Y.) coated with a carbon binder slurry of 70 (wt) % acetylene black and 30% PVdF, with a dry slurry weight of about 1.3 mg/cm² was used.

Lead based electron transfer mediums used as the cathode (i.e., lead based cathodes) were prepared by electroplating lead as a surface coating onto a core electronically conducting substrate of nickel (Ni ExMet type 5Ni 5-050 from DEXMET Corp.). The lead was coated from a solution having the following composition:
200 g/L Lead (II) Carbonate, $PbCO_3$,
100 mL/L Tetrafluoroboric acid, $HBF_4$,
15 g/L Boric acid, $H_3BO_3$,
5 g/L Hydroquinone.
A rectangular piece of lead foil with a thickness of 1.6 mm was used as an anode during electroplating. The current density was 5 mA/cm² and the thickness of the deposited lead coating was approximately 30 μm.

Cobalt based electron transfer mediums used as the cathode (i.e., cobalt based cathodes) were prepared by electroplating cobalt onto a copper substrate (Cu ExMet 1.5 Cu 5.5-OSOF1 from Delker Corp.) from a solution having the following composition:
450 g/L Cobalt Sulfate Heptahydrate, $CoSO_4 \cdot 7H_2O$,
15 g/L Sodium Chloride, NaCl,
40 g/L Boric acid, $H_3BO_3$.

A graphite plate with a thickness of 6 mm served as an anode during electroplating. Electroplating was performed at a temperature of 35-40° C. at a current density of 20 mA/cm$^2$ and the resulting thickness of the deposited cobalt was approximately 25 μm.

Example 6

Determination of Potential Window for Li/S Cell Operation Using Cyclic Voltammetry Cyclic voltammetry experiments were performed in hermetically sealed glass cells with plastic covers. The cells were assembled and filled with polysulfide-containing aqueous electrolyte in a glove box containing argon gas with an oxygen concentration of less than 5 ppm (i.e., substantially devoid of molecular oxygen). Aqueous electrolyte (first electrolyte) containing polysulfides had a composition of 4M Sulfur and an active stoichiometric ratio of $Li_2S_3$. For comparison testing, an aqueous electrolyte (second electrolyte) based on lithium sulfate, which did not contain active sulfur species, was also prepared. The pH of the second electrolyte was adjusted to the pH of the first electrolyte (pH 12) by addition of LiOH.

The working electrode was either a 1 cm×1 cm square carbon based cathode or a 1 cm×1 cm square lead cathode as described above. The working electrode was located between two protected lithium electrodes (as described herein above) serving as counter-electrodes in the cell. Lithium foil area was 22 mm×22 mm in each of the counter electrodes. Working electrode potential was measured vs. an Ag/AgCl reference electrode and then was recalculated into potentials vs. a Li/Li$^+$ electrode. The cyclic voltammetry curves were measured using a VMP-3 potentiostat/galvanostat (Bio-Logic Science Instruments, France) at a scan rate of 0.5 mV/s.

Figure 8:
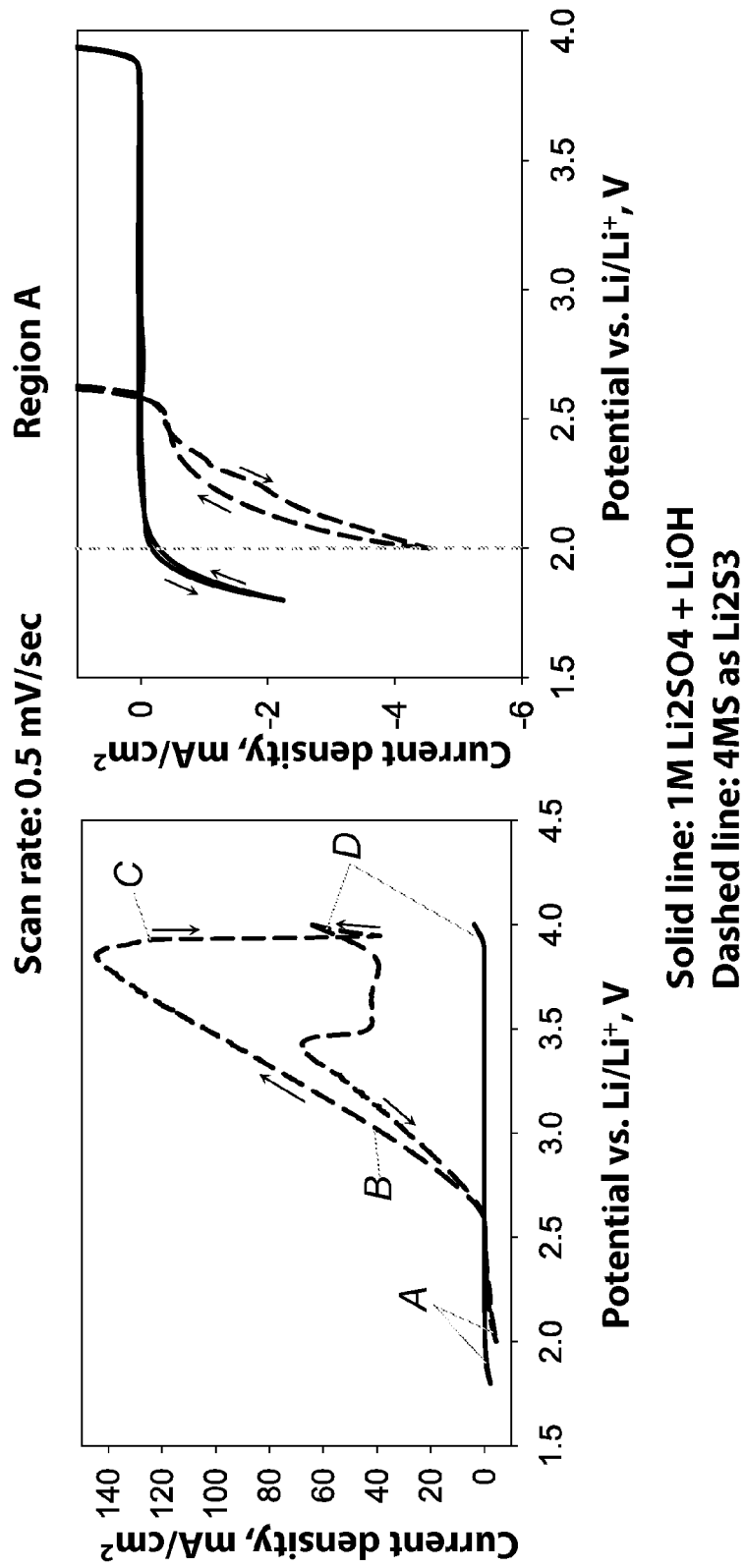
FIG. 8 is a plot comparing the cyclic voltammogram of an aqueous lithium sulfur cell in accordance with an embodiment of the present invention and a cell without active sulfur.

FIG. 8 shows cyclic voltammetry curves for a carbon electrode in aqueous electrolytes with and without dissolved polysulfides. The cyclic voltammetry curves have several characteristic regions. (Region A is magnified on the right graph of FIG. 8). The voltammetry curve of the sulfate electrolyte allows determination of the hydrogen evolution potential (cathodic current in region A at potentials below 2.0V) and oxygen evolution (anodic current in region D at potentials above 3.8V) on the surface of the carbon electrode (i.e., carbon based electron transfer medium). Comparison of voltammetry curves for the two electrolytes indicates that cathodic currents in region A for the polysulfide electrolyte are attributed to electroreduction of sulfur-containing species. The right graph clearly shows that in order to minimize the contribution of the side reaction (hydrogen evolution) in the cell with a carbon based electron transfer medium serving as cathode, the cell discharge voltage should not be allowed to go below approximately 2.0V in certain embodiments. Region B on the polysulfide electrolyte curve corresponds to the electrooxidation of sulfur-containing species. Highly oxidized sulfur-containing species can decompose forming elemental sulfur, which can also be formed directly at high enough positive potentials. Deposition of insulative sulfur on the carbon surface leads to a decrease in current (region C) and large hysteresis on the cyclic voltammetry curve at potentials over 2.7-2.8V.

Figure 9:
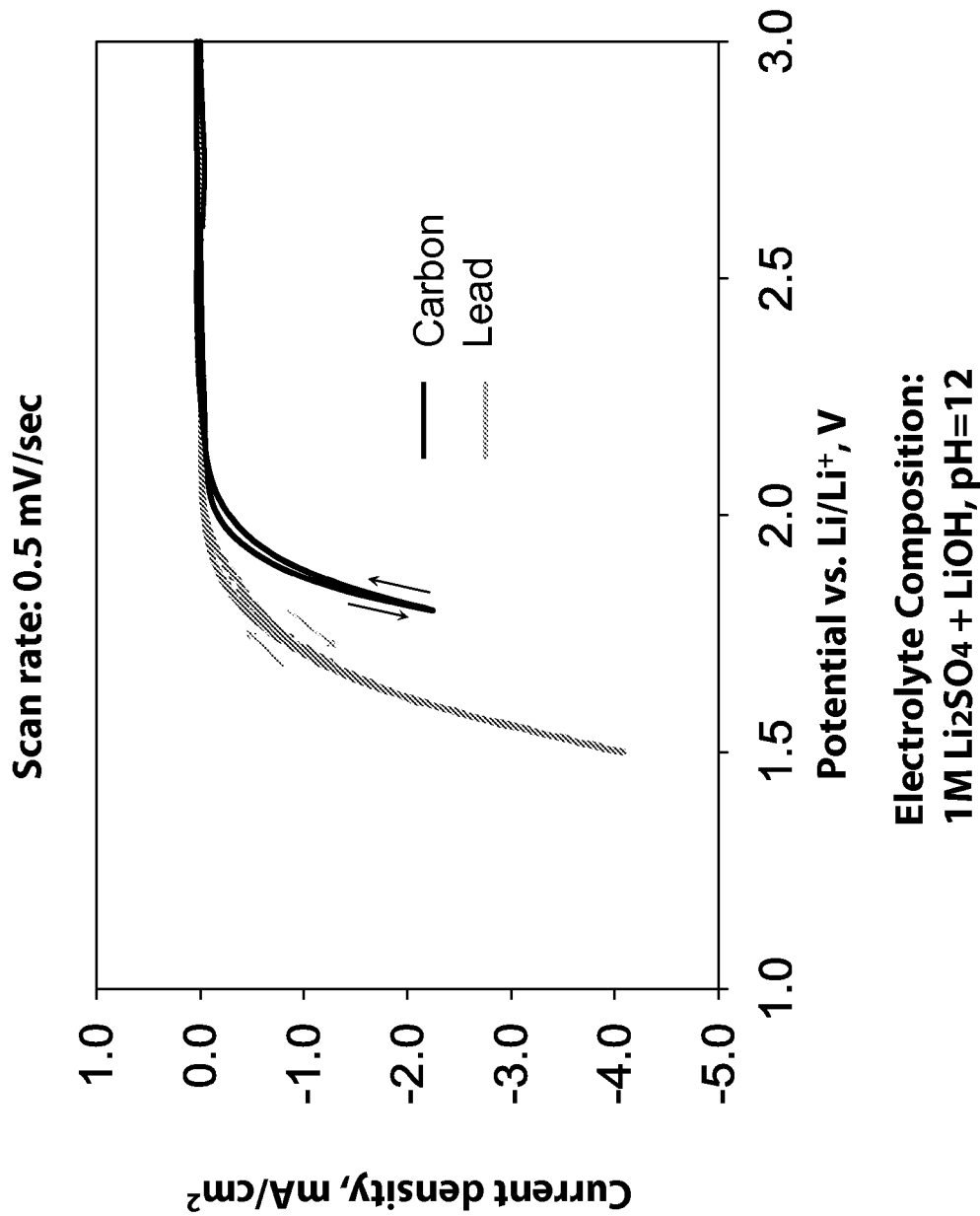
FIG. 9 is a cyclic voltammetric plot comparing the potential window for aqueous lithium sulfur cell operation using two different cathode materials.

FIG. 9 demonstrates that the lead based electrode has a significantly greater overpotential for hydrogen evolution than the carbon electrode. Therefore, the use of lead on the electron transfer medium allows for an increase in the potential window for Li/S cell operation.

Figure 10:
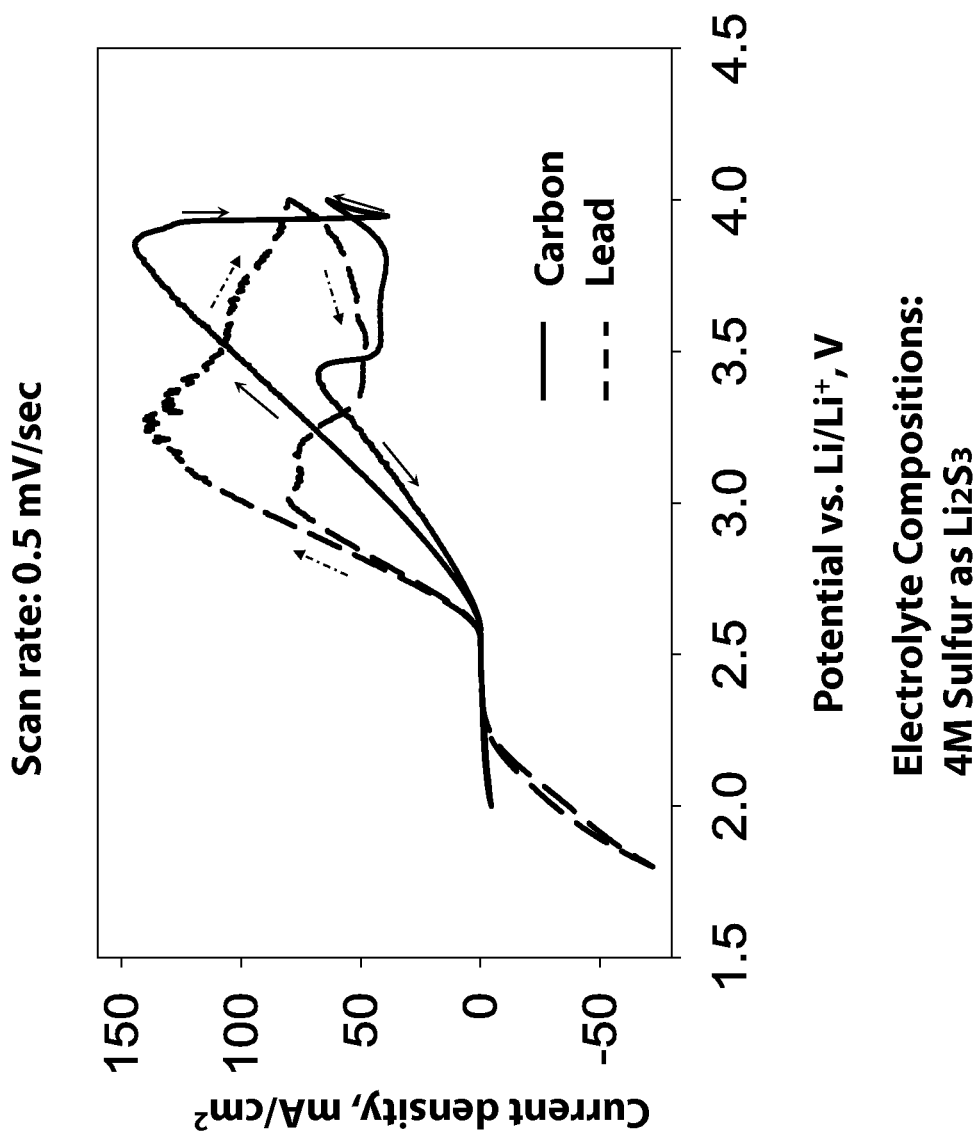
FIG. 10 is a cyclic voltammetric plot comparing alternative aqueous lithium sulfur cell embodiments in accordance with the present invention.

FIG. 10 shows cyclic voltammetry curves in a wide potential range for carbon and lead positive electrodes (i.e., cathodes) in electrolytes containing dissolved polysulfides. These curves demonstrate that the prepared lead electrode had a better rate capability than the carbon electrode.

Example 7

Cyclic Performance of Li/S Cells with Carbon Cathode

Cyclability tests were performed in hermetically sealed Li/S cells having two compartments: a protected lithium anode compartment and an aqueous sulfur cathode compartment. A substantially impervious glass-ceramic membrane, as described herein above, was fitted into the cell by means of two Kalrez o-rings such that the membrane was exposed to the aqueous catholyte from the cathode side and to the non-aqueous electrolyte from the anode side. The anode compartment was assembled in an argon-filled dry box and contained a 125 μm-thick lithium foil from FMC Lithium Corp in a shape of a disc with a diameter of ½" pressed onto a nickel foil current collector, a 1"×1" square 150 μm-thick glass-ceramic solid electrolyte membrane from Ohara Corp. (Japan), and Celgard 2400 microporous separator in a shape of a disc with a diameter of ⁹⁄₁₆". The separator was impregnated with a non-aqueous electrolyte containing 1 M of LiTFSI salt in 1,3-dioxolane and placed between the Li foil surface and the glass-ceramic membrane.

After the anode compartment was built, it was transferred to the dry box filled with oxygen-free argon, where the cathode compartment was assembled, filled with aqueous catholyte and hermetically sealed. The aqueous catholyte (Catholyte #2) contained 12M S as $Li_2S_4$ in water. A ⁹⁄₁₆"-diameter disc of microporous Celgard 3401 separator was impregnated with the catholyte and placed on the surface of the glass-ceramic protective membrane. The carbon based cathode described above was cut in a shape of a ½"-diameter disc and placed on top of the Celgard 3401 separator layer. A ½"-diameter stainless steel disc was used as a cathode current collector. The components of the cathode compartment were kept in contact with a stainless steel spring. The assembled cell exhibited an open circuit voltage of greater than 2.5 volts.

Cell cycling was performed using a Maccor battery tester. The cycling procedure was as follows. The first discharge at a current density of 1 mA/cm$^2$ to the cut-off voltage of 2.1V was followed by a charge at 0.5 mA/cm$^2$ to the capacity equal to the previous discharge capacity. The second discharge was equal to the previous charge capacity. Then the cell was cycled at a constant capacity corresponding to the second discharge. The charge cut-off voltage was set to 2.8V.

Figure 11:
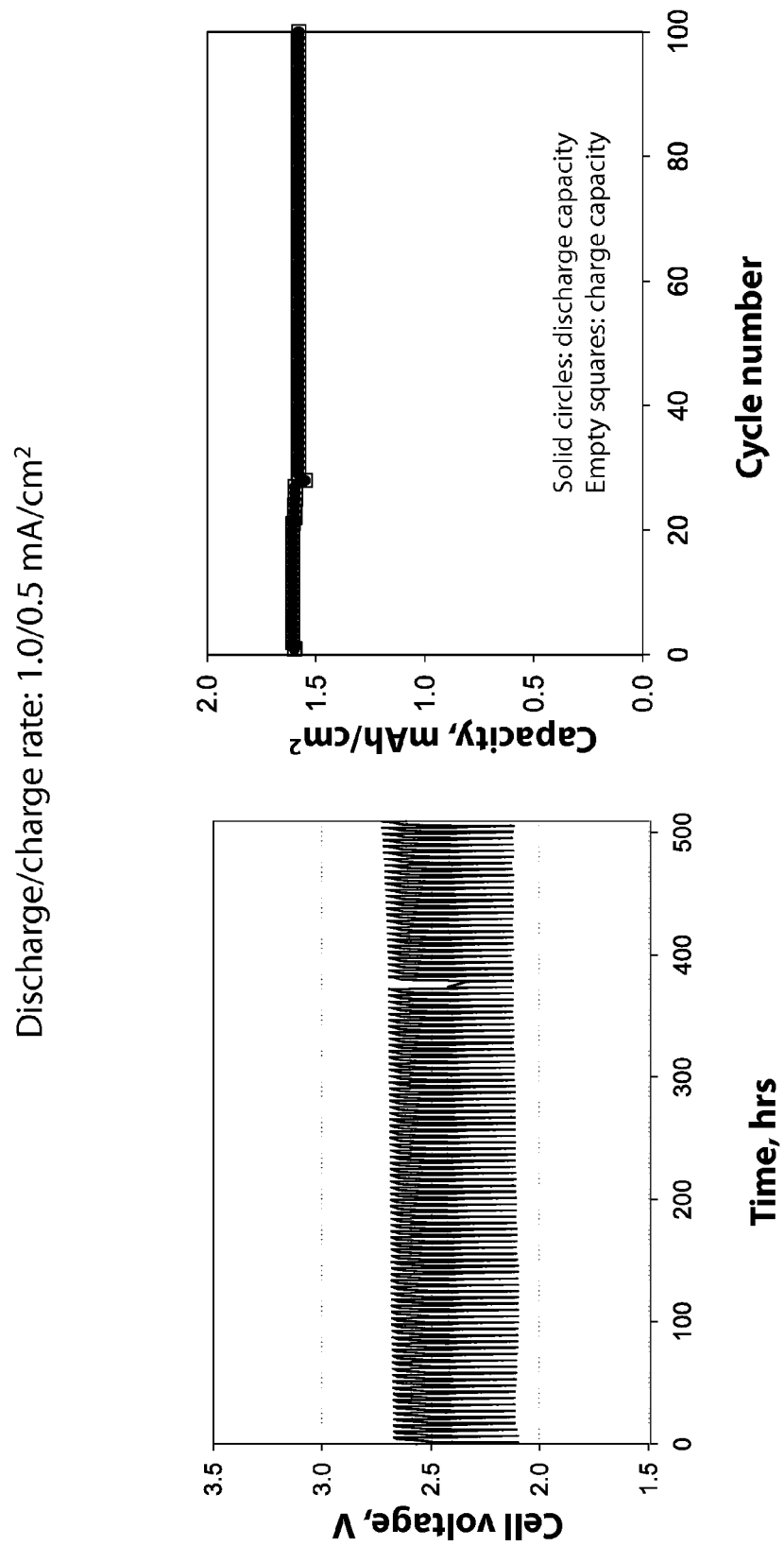
FIG. 11 is a voltage vs. time cycling profile and a capacity vs. cycle number profile for an aqueous lithium sulfur cell in accordance with the present invention.

FIG. 11 shows the cycling performance of the Li/S cell. The cell exhibited good cyclability and over 100 cycles were achieved. This is the first known example of a rechargeable aqueous Li/S cell having dissolved active sulfur species.

Figure 12:
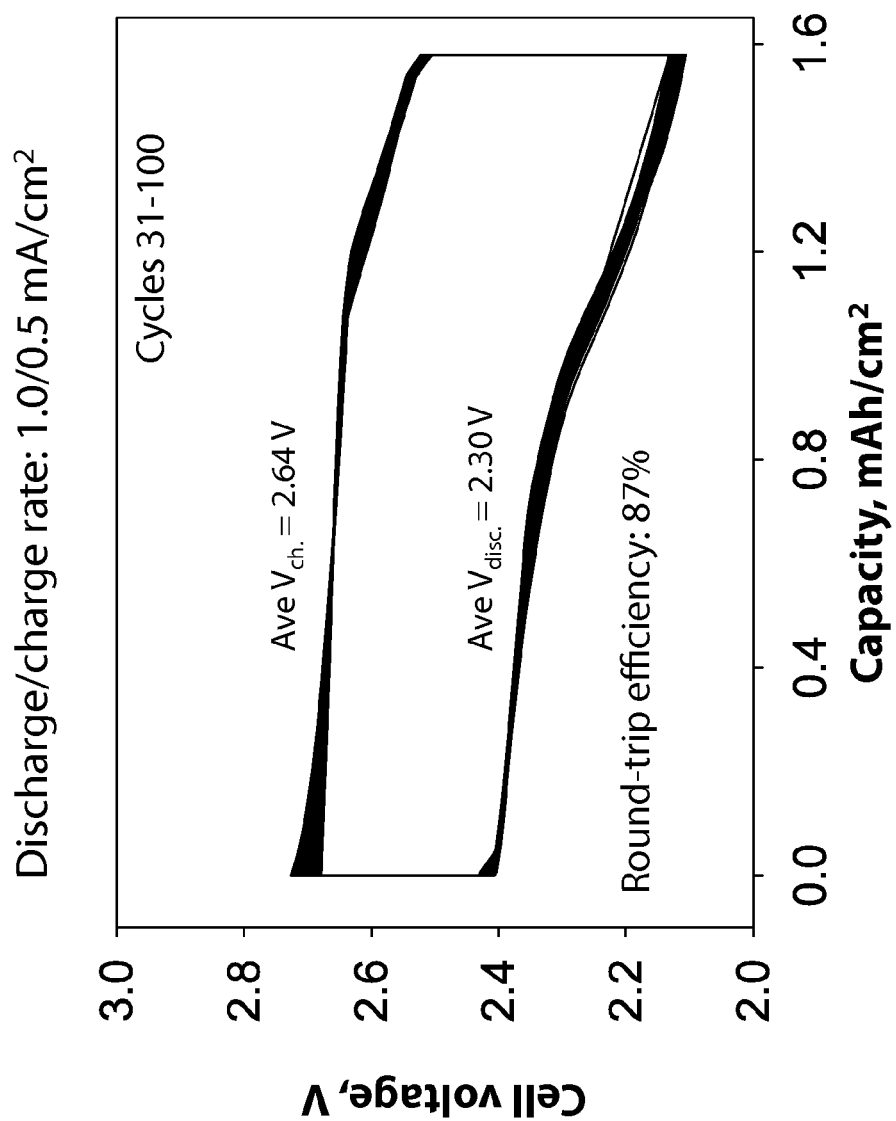
FIG. 12 is a voltage vs. capacity profile for an aqueous lithium sulfur cell in accordance with the present invention.

FIG. 12 shows charge and discharge voltage profiles. A high round-trip efficiency value of 87% was calculated from average discharge and charge voltages.

Example 8

The Li/S cell and catholyte composition were the same as described in Example #7. However, in this case the carbon based cathode and the stainless steel cathode current collector were immersed overnight in a solution with the same composition as the Li/S cell catholyte, 12M S having an active stoichiometric ratio of $Li_2S_4$ in water. The goal of this pre-treatment was to avoid consumption of active sulfur species by the reaction with the cathode and the current collector in the assembled cell. After storage in the catholyte solution overnight, the cathode and the current collector were removed and rinsed in sequence with 0.5M LiOH, water, toluene, and methanol, and then dried. It was found that the pre-treatment in a sulfur-containing solution greatly improved the wettability of the carbon electrode with catholyte during cathode compartment filling. The cycling procedure included a discharge at a current density of 1 mA/cm$^2$ to the cut-off voltage of 2.0V and a charge at 0.5 mA/cm$^2$ to the capacity equal to the previous discharge capacity. The charge cut-off voltage was set to 2.8V.

Figure 13:
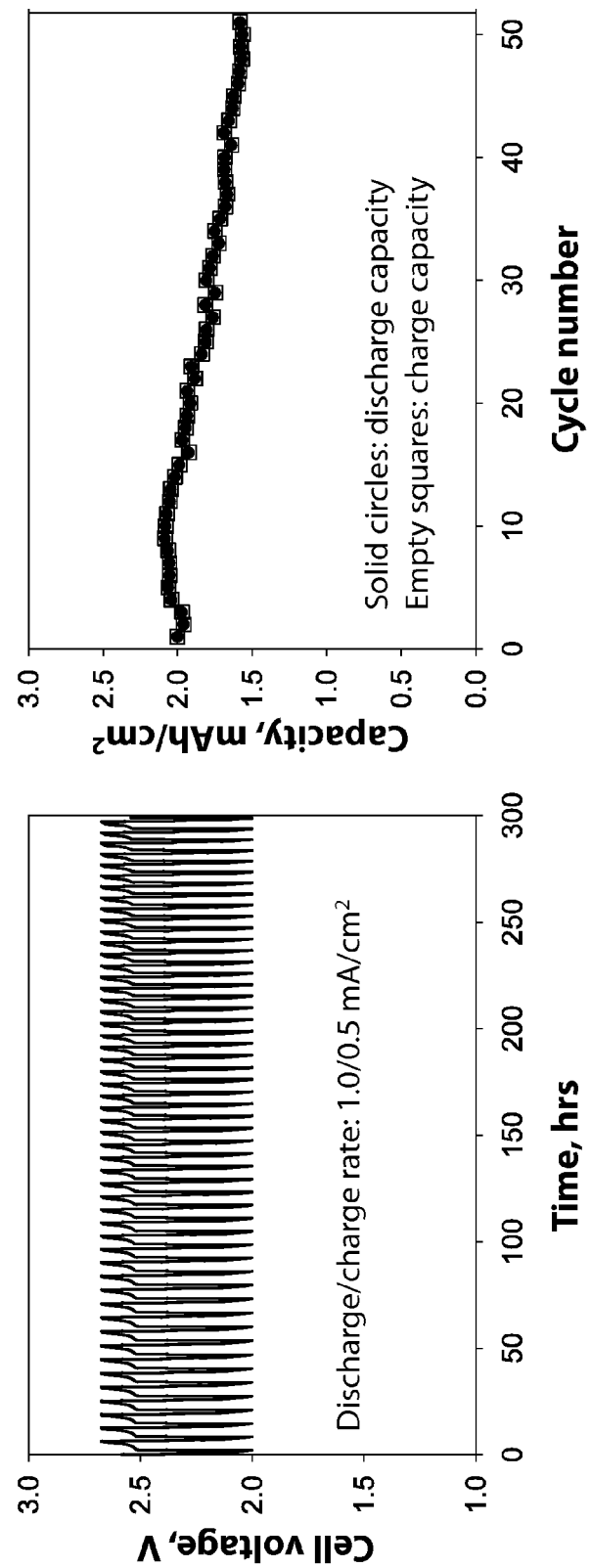
FIG. 13 is a voltage vs. time cycling profile and a capacity vs. cycle number profile for an aqueous lithium sulfur cell in accordance with an embodiment of the present invention.

Voltage-time discharge/charge profiles and delivered capacity vs. cycle number plots are shown in FIG. 13. Under described test conditions, the cell demonstrated good cycle life of over 50 cycles with small capacity fade.

Example 9

The cell and catholyte composition and cycling procedure were the same as described in Example #7. However, instead of a carbon electrode with a nickel current collector, a lead electrode with a lead current collector was used. The electrode and the current collector were pre-treated in the catholyte solution as described in Example #8.

Figure 14:
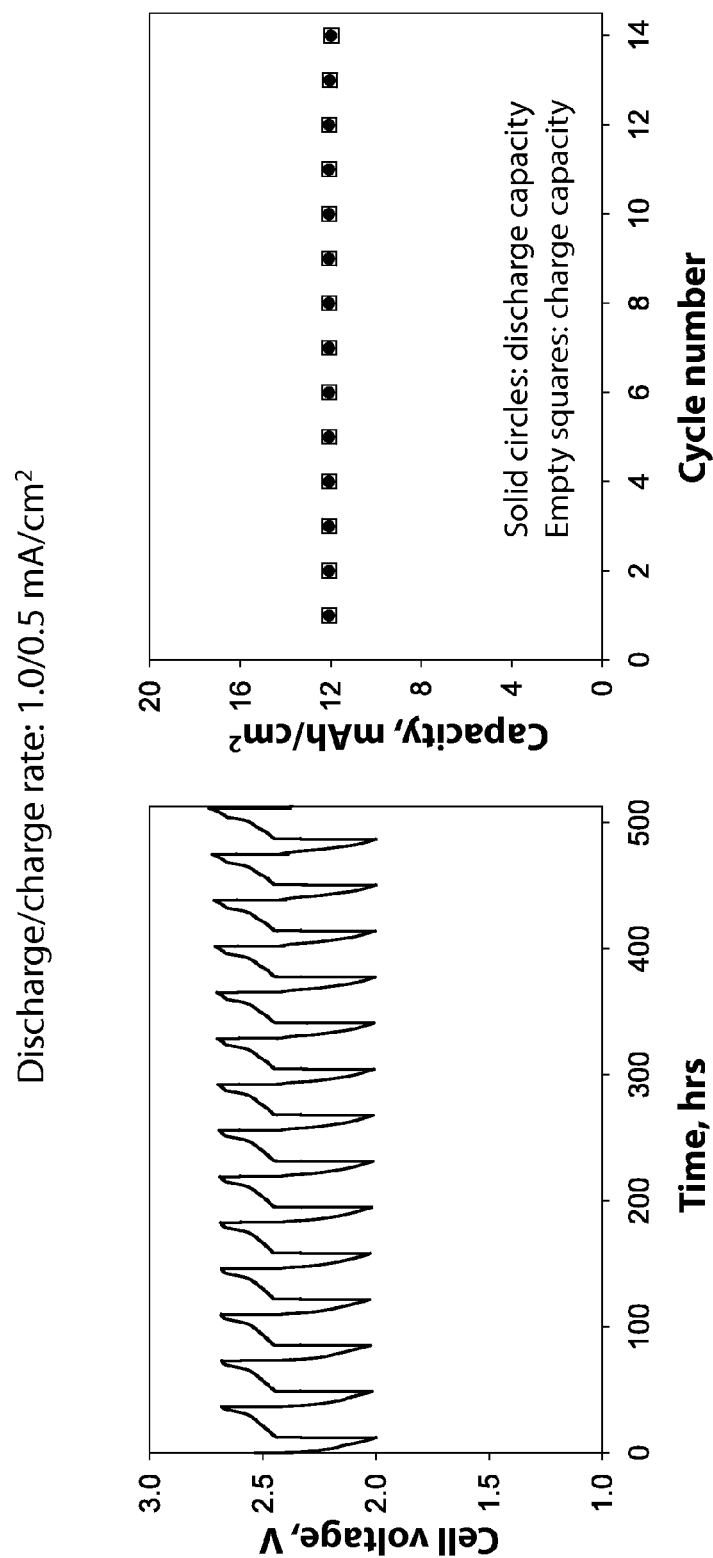
FIG. 14 is a voltage vs. time cycling profile and a capacity vs. cycle number profile for an aqueous lithium sulfur cell in accordance with an embodiment of the present invention.

As seen in FIG. 14, which shows voltage-time discharge/charge profiles and delivered capacity vs. cycle number plots, Li/S cells using the lead based cathode can be cycled at a high areal capacity of approximately 12 mAh/cm$^2$.

Example 10

The cell and catholyte composition were the same as described in Example #7. The cycling procedure was the same as described in Example #8. However, instead of a carbon electrode with a nickel current collector, a cobalt electrode described above with a cobalt-electroplated copper current collector was used. The electrode and the current collector were pre-treated in the catholyte solution as described in Example #8.

Figure 15:
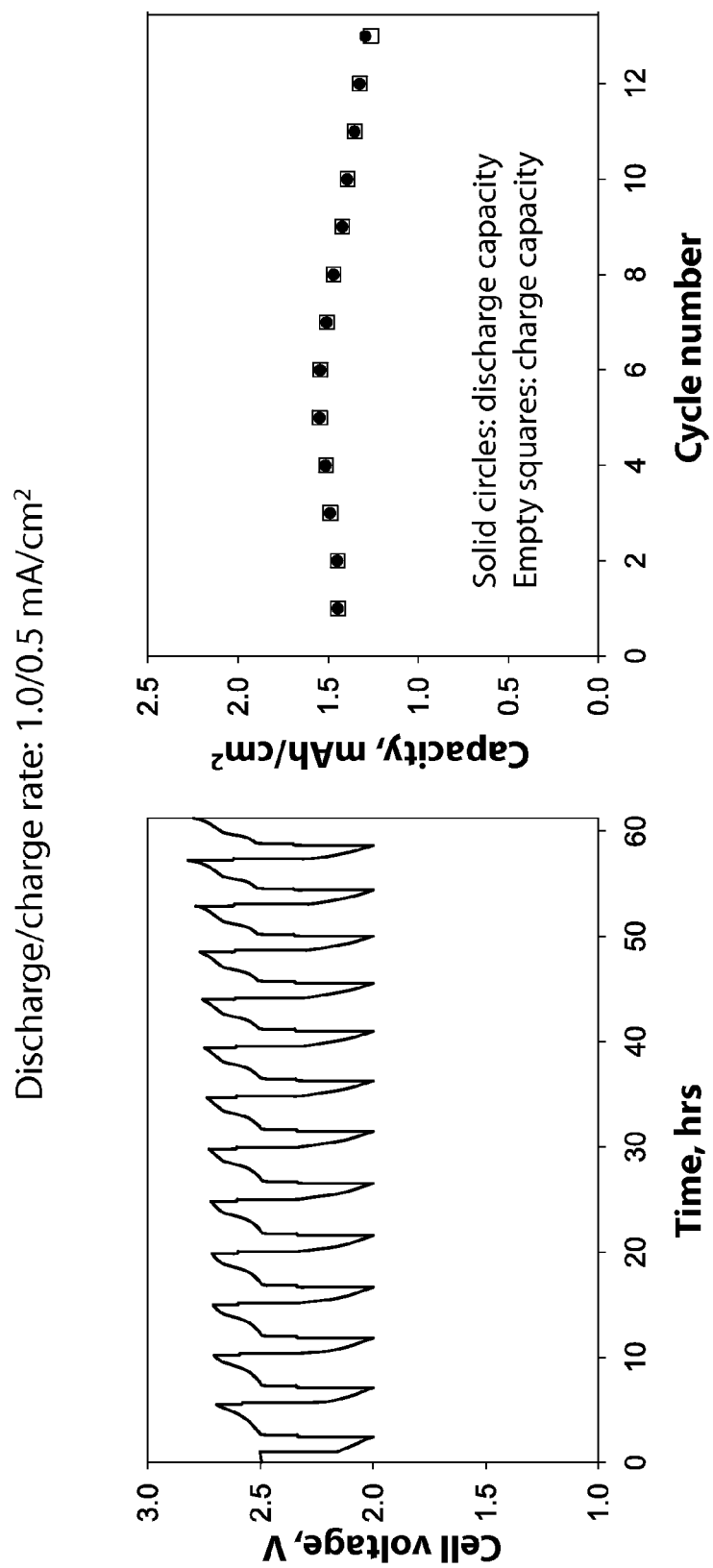
FIG. 15 is a voltage vs. time cycling profile and a capacity vs. cycle number profile for an aqueous lithium sulfur cell in accordance with an embodiment of the present invention.

Voltage-time discharge/charge profiles and delivered capacity vs. cycle number plots are shown in FIG. 15. Under described test conditions, the cell demonstrated several discharge-charge cycles.

Example 11

The cell was similar to the one described in Example #7. However, in this case a carbon anode was used instead of a lithium metal anode, and the aqueous catholyte contained 3M Li$_2$S (Catholyte #4). The anode was a commercial carbon electrode comprising synthetic graphite on a copper substrate and was similar to carbon electrodes commonly used in lithium-ion batteries. The non-aqueous electrolyte interlayer contained 1M of LiTFSI salt dissolved in the mixture of ethylene carbonate and dimethyl carbonate (1:1 by volume). The assembled cell with the following structure: carbon anode/non-aqueous electrolyte/glass-ceramic membrane/aqueous Li$_2$S catholyte/carbon cathode exhibited an open circuit voltage of −0.63V First, the cell was galvanostatically charged at a current density of 0.1 mA/cm$^2$ for 20 hours. At the end of the charge, the cell voltage reached approximately 2.4V. Then, the cell was discharged at 0.1 mA/cm$^2$ to a voltage cut-off of 2.1V. The same charge/discharge procedure was used for further cycling: the cell was charged at 0.1 mA/cm$^2$ for 20 hours and then discharged at 0.1 mA/cm$^2$ to 2.1V.

Figure 16:
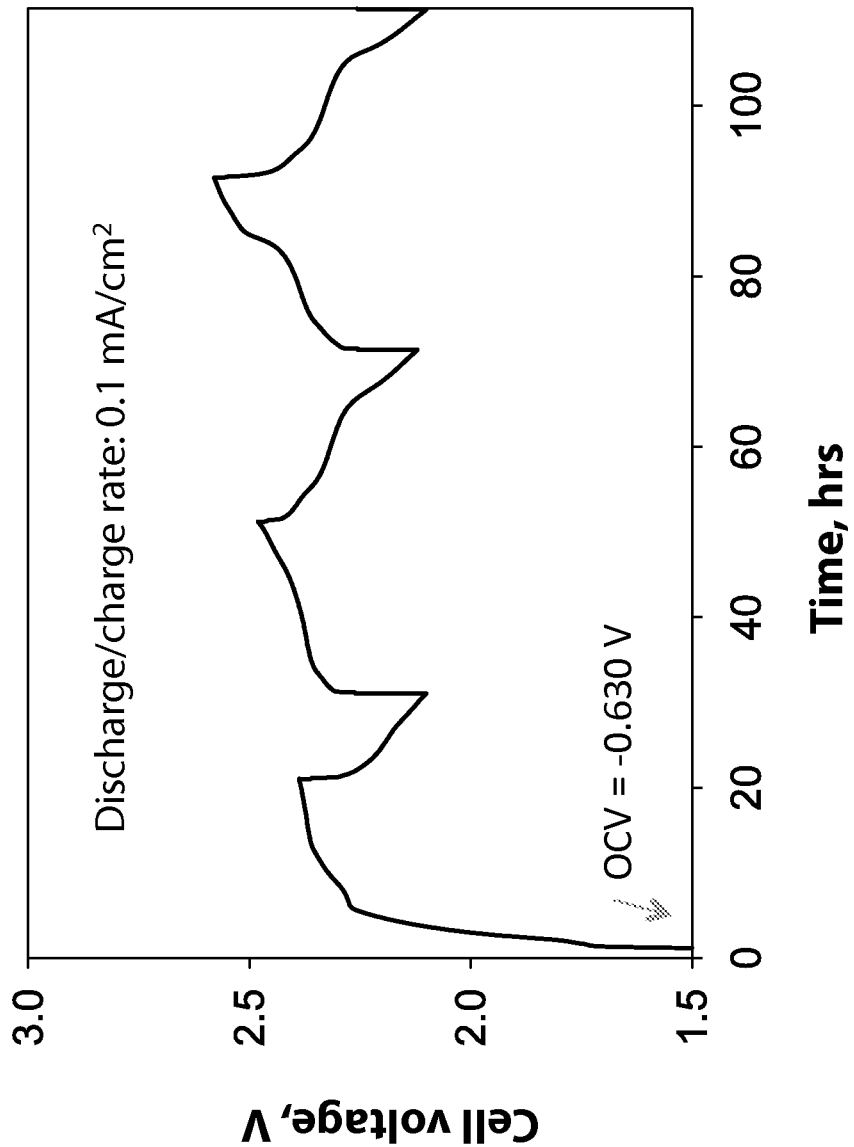
FIG. 16 is a voltage vs. time cycling profile for an aqueous lithium sulfur cell in accordance with an embodiment of the present invention.

FIG. 16 demonstrates that a cell employing a carbon anode and an aqueous electrolyte containing Li$_2$S can work reversibly. This is the first known example of an aqueous solution containing lithium sulfides or polysulfides being used as a source of Li cations for charging of a carbon anode. Therefore, aqueous catholytes containing active sulfur species can be used in combination with lithium intercalation compounds in rechargeable lithium-sulfur batteries.

Example 12

The cell, pre-treated cathode and cycling procedure were the same as described in Example #10. However, the catholyte contained 6M S having an active stoichiometric ratio of Li$_2$S$_4$ in methanol (Catholyte #5, described above).

Figure 17:
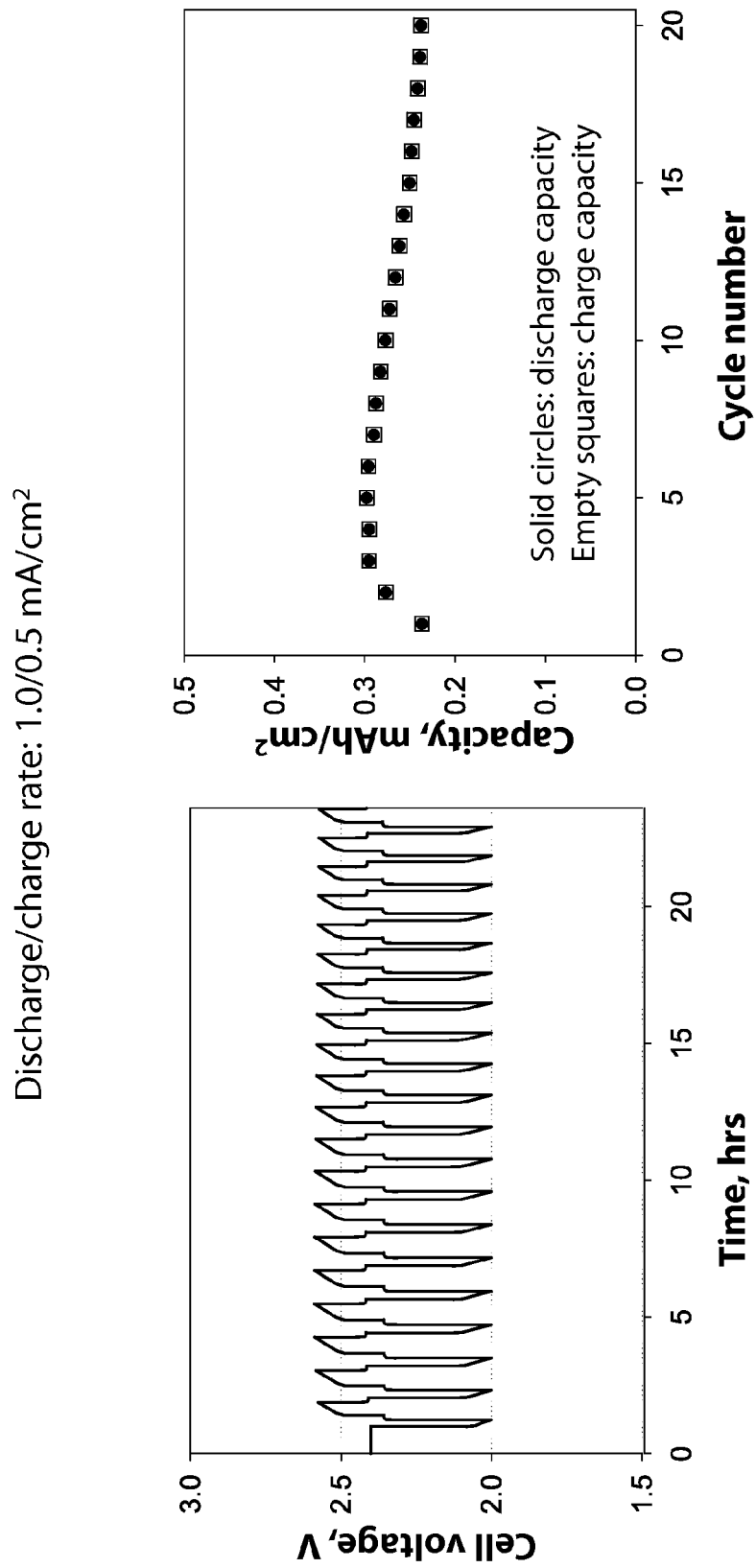
FIG. 17 is a voltage vs. time cycling profile and a capacity vs. cycle number profile for a lithium sulfur cell in accordance with an embodiment of the present invention.

Voltage-time discharge/charge profiles and delivered capacity vs. cycle number plots for Li/S cells with a cobalt cathode and methanol-based sulfur-containing catholyte are shown in FIG. 17. Under the described test conditions, the cell demonstrated several discharge-charge cycles. This is the first known example of a rechargeable Li/S cell with a catholyte based on a protic nonaqueous solvent.

CONCLUSION

Various embodiments of the invention have been described. However a person of ordinary skill in the art will recognize that various modifications may be made to the described embodiments without departing from the scope of the claims. Accordingly, the present embodiments are to be considered as illustrative and not restrictive, and the invention is not to be limited to the details given herein.

What is claimed is:

1. An aqueous lithium sulfur electrochemical cell comprising:
    an anode structure comprising a lithium electroactive material;
    a cathode comprising a solid electron transfer medium;
    an aqueous electrolyte comprising at least 10% of a nonaqueous solvent in direct contact with the electron transfer medium; and
    active sulfur species in direct contact with the aqueous electrolyte;
    wherein the anode electroactive material is isolated from direct contact with the aqueous electrolyte whereby the anode electroactive material does not contact water of the aqueous electrolyte or the active sulfur species.

2. The aqueous lithium sulfur electrochemical cell of claim 1, wherein the nonaqueous solvent is a protic liquid.

3. The aqueous lithium sulfur electrochemical cell of claim 2, wherein the aqueous electrolyte comprises about 10-70% of the protic liquid.

4. The aqueous lithium sulfur electrochemical cell of claim 2, wherein the aqueous electrolyte comprises about 20-60% of the protic liquid.

5. The aqueous lithium sulfur electrochemical cell of claim 2, wherein the aqueous electrolyte has a composition such that it has a pH of at least 12, absent the protic liquid.

6. The aqueous lithium sulfur electrochemical cell of claim 1, wherein the active sulfur species concentration in the aqueous electrolyte is greater than 10 Molar.

7. The aqueous lithium sulfur electrochemical cell of claim 1, wherein the active sulfur species concentration in the aqueous electrolyte is greater than 15 Molar.

8. The aqueous lithium sulfur electrochemical cell of claim 2, wherein the protic liquid is an amine.

9. The aqueous lithium sulfur electrochemical cell of claim 2, wherein the protic liquid is an alcohol.

10. The aqueous lithium sulfur electrochemical cell of claim 1, wherein the ratio of active sulfur to active lithium dissolved in the aqueous electrolyte is greater than 5.

11. The aqueous lithium sulfur electrochemical cell of claim 10, wherein the ratio of active sulfur to active lithium dissolved in the aqueous electrolyte is greater than 5 prior to initial cell operation.

12. The aqueous lithium sulfur electrochemical cell of claim 1, wherein the cell is a secondary battery cell.

13. An aqueous lithium sulfur electrochemical cell comprising:
   an anode structure comprising an electroactive material;
   a cathode comprising a solid electron transfer medium;
   an aqueous electrolyte in direct contact with the electron transfer medium, wherein the aqueous electrolyte comprises deoxygenated water; and
   active sulfur species in direct contact with the aqueous electrolyte;
   wherein the anode electroactive material is isolated from direct contact with the aqueous electrolyte whereby the anode electroactive material does not contact water of the aqueous electrolyte or the active sulfur species.

14. The aqueous lithium sulfur electrochemical cell of claim 13, wherein the concentration of molecular oxygen in the aqueous electrolyte is less than 1000 ppm.

15. The aqueous lithium sulfur electrochemical cell of claim 14 wherein the concentration of molecular oxygen in the aqueous electrolyte is less than 100 ppm.

16. The aqueous lithium sulfur electrochemical cell of claim 13, wherein the cell is a secondary battery cell.

17. An aqueous lithium sulfur electrochemical cell comprising:
   an anode structure comprising an electroactive material;
   a cathode comprising a solid electron transfer medium;
   an aqueous electrolyte in direct contact with the electron transfer medium; and
   active sulfur species in direct contact with the aqueous electrolyte;
   wherein the anode electroactive material is isolated from direct contact with the aqueous electrolyte whereby the anode electroactive material does not contact water of the aqueous electrolyte or the active sulfur species; and
   wherein the full charge capacity of the cell prior to initial cell operation is derived from dissolved active sulfur species in the aqueous electrolyte and solid phase lithium sulfide in contact with the aqueous electrolyte.

18. The aqueous lithium sulfur electrochemical cell of claim 17, wherein the anode is substantially devoid of active lithium.

19. The aqueous lithium sulfur electrochemical cell of claim 18, wherein the lithium electroactive material of the anode is an intercalation material.

20. The aqueous lithium sulfur electrochemical cell of claim 17, wherein the cell is a secondary battery cell.

* * * * *